(12) United States Patent
Tsuchiya

(10) Patent No.: US 11,645,944 B2
(45) Date of Patent: May 9, 2023

(54) LEARNING TOY, MOBILE BODY FOR LEARNING TOY, AND PANEL FOR LEARNING TOY

(71) Applicant: ICON CORP., Yokohama (JP)

(72) Inventor: Toshiko Tsuchiya, Kanagawa (JP)

(73) Assignee: ICON CORP., Yokohama (JP)

( * ) Notice: Subject to any disclaimer, the term of this patent is extended or adjusted under 35 U.S.C. 154(b) by 0 days.

(21) Appl. No.: 16/624,003

(22) PCT Filed: Jul. 9, 2019

(86) PCT No.: PCT/JP2019/027150
§ 371 (c)(1),
(2) Date: Dec. 18, 2019

(87) PCT Pub. No.: WO2020/017396
PCT Pub. Date: Jan. 23, 2020

(65) Prior Publication Data
US 2021/0366308 A1     Nov. 25, 2021

(30) Foreign Application Priority Data

Jul. 19, 2018  (JP) .............................. JP2018-135792
Jul. 24, 2018  (JP) .............................. JP2018-138235
Jan. 28, 2019  (JP) .............................. JP2019-011919

(51) Int. Cl.
*G09B 19/00*    (2006.01)
*A63H 3/00*    (2006.01)
(Continued)

(52) U.S. Cl.
CPC .......... *G09B 19/0053* (2013.01); *A63H 3/006* (2013.01); *A63H 3/28* (2013.01);
(Continued)

(58) Field of Classification Search
CPC .................................................. G09B 19/0053
See application file for complete search history.

(56) References Cited

U.S. PATENT DOCUMENTS 5,656,907 A * 8/1997 Chainani ............ G09B 19/0053
                                                  318/587
9,333,427 B2  5/2016 Sabo et al.
(Continued)

FOREIGN PATENT DOCUMENTS

JP    2001-228963    8/2001
JP    2010-167149    8/2010
(Continued)

OTHER PUBLICATIONS

"Kumiita-Educational programming toy for 0 year olds on up", Kickstarter, Aug. 26, 2019, 14 pages.
(Continued)

*Primary Examiner* — Peter R Egloff
(74) *Attorney, Agent, or Firm* — Staas & Halsey LLP

(57) ABSTRACT

A learning toy which enables learning of high-level programming in a stepwise manner. A movement path is constituted by a plurality of command panels in which command information which can be read with an optical reading module is recorded being arranged. A mobile robot sequentially reads command information included in the command panels through which the mobile robot passes while moving along the movement path and stores a plurality of pieces of command information in a command information memory. The mobile robot takes out a plurality of pieces of command information from arbitrary positions in the command information memory to execute operation. If a plurality of pieces of command information necessary for operation of the mobile robot are stored in the command information memory, a control unit of the mobile robot automatically
(Continued)

extracts and takes out the command information and causes the mobile robot to operate.

27 Claims, 15 Drawing Sheets

(51) Int. Cl.
    *A63H 3/28*     (2006.01)
    *A63H 11/00*     (2006.01)
    *A63H 17/395*     (2006.01)
    *A63H 18/16*     (2006.01)

(52) U.S. Cl.
    CPC ........... *A63H 11/00* (2013.01); *A63H 17/395* (2013.01); *A63H 18/16* (2013.01)

(56) References Cited

U.S. PATENT DOCUMENTS

| | | | |
|---|---|---|---|
| 2013/0288560 A1* | 10/2013 | Abou-Hamda | G05D 1/0234 446/175 |
| 2015/0356881 A1* | 12/2015 | Butler | G09B 17/003 434/169 |
| 2016/0346705 A1 | 12/2016 | Togawa et al. | |
| 2017/0007915 A1* | 1/2017 | Moscatelli | G09B 23/00 |
| 2017/0344127 A1 | 11/2017 | Hu et al. | |
| 2021/0077915 A1* | 3/2021 | Blaustein | A63H 17/395 |
| 2021/0110735 A1* | 4/2021 | Nagasaka | G06F 9/44 |

FOREIGN PATENT DOCUMENTS

| | | |
|---|---|---|
| JP | 2010-240345 | 10/2010 |
| JP | 2017-161770 | 9/2017 |
| JP | 2018-38816 | 3/2018 |
| JP | 3215614 | 3/2018 |
| WO | WO 2018/025467 A1 | 2/2018 |
| WO | WO 2018/029354 A1 | 2/2018 |

OTHER PUBLICATIONS

"Programming thinking to train from 0 years old! What is "Kumiita" that can be used for education while playing?", Aug. 26, 2019, 11 pages, https://edtech.jp/news/29.
"Two kinds of wooden toy 'Primo Toys Cubetto' for learning programming are released", fabcross, Aug. 26, 2019, 2 pages, https://fabcross.jp/news/2017/20171101_programmingtoy_cubetto.html.
International Search Report dated Sep. 3, 2019 in corresponding International Patent Application No. PCT/JP2019/027150.
Written Opinion of the International Searching Authority, PCT/ISA/220, dated Sep. 3, 2019 in corresponding International Patent Application No. PCT/JP2019/027150.
PCT/IB/373, International Preliminary Report on Patentability, and PCT/ISA/237, Written Opinion of the International Searching Authority, dated Jan. 19, 2021, in corresponding International Patent Application No. PCT/JP2019/027150.
PCT/IB/326 and PCT/IB/338 dated Jan. 28, 2021, in corresponding International Patent Application No. PCT/JP2019/027150.
Extended European Search Report dated Mar. 21, 2022 in corresponding European Patent Application No. 19817938.4 (8 pages).

\* cited by examiner ature 2, action of an avatar appearing on a screen of a display can be arbitrarily set by a desired activity block being put in a pocket of a master block (that is, an operation device).

LEARNING TOY, MOBILE BODY FOR LEARNING TOY, AND PANEL FOR LEARNING TOY

CROSS-REFERENCE TO RELATED APPLICATIONS

This application is a U.S. National Stage Application which claims the benefit under 35 U.S.C. § 371 of International Patent Application No. PCT/JP2019/027150 filed Jul. 9, 2019, which claims benefit of priority under 35 U.S.C. § 119 to Japanese Patent Application No. 2018-135792, filed on Jul. 19, 2018; Japanese Patent Application No. 2018-138235 filed Jul. 24, 2018; Japanese Patent Application No. 2019-011919 filed Jan. 28, 2019, the entire contents of which is incorporated by reference herein.—

TECHNICAL FIELD

The present invention relates to a toy which programs operation of a robot, and relates to a learning toy in which a robot which self-travels on a panel reads command information recorded in the panel, and operates based on the command information.

BACKGROUND ART

Conventionally, as a toy which causes a self-traveling mobile body to move on a movement path, for example, one disclosed in the following Patent Literature 1 is known. In the toy disclosed in Patent Literature 1, a pattern for data and a pattern for clock are respectively formed in parallel in a right half portion and in a left half portion of a traveling surface along a traveling path. A mobile body moves on the traveling surface while reading these two types of patterns. The whole traveling path is formed in an endless shape, that is, in a loop shape by a plurality of course parts having various kinds of shapes including a linear shape, a curved shape and a slope shape being connected. Because the pattern for data formed on the traveling surface indicates a course part ID which specifies the shape of each course part, the mobile body can identify the course shape by reading the pattern for data. The mobile body not only can identify the course shape but also can acquire actual traveling result data such as a deviation occurrence section and a jump section. A player can enjoy setting traveling control data such as speed and acceleration of the mobile body at each position on the traveling path based on the course shape and the actual traveling result data to make improvements so as to shorten traveling time.

Further, as a toy with which operation of a target can be changed as appropriate based on a command arbitrarily set by a player, one disclosed in the following Patent Literature 2 is known. With the toy disclosed in Patent Literature 2, action of an avatar appearing on a screen of a display can be arbitrarily set by a desired activity block being put in a pocket of a master block (that is, an operation device).

CITATION LIST

Patent Literature

Patent Literature 1: Japanese Patent Laid-Open No. 2010-167149
Patent Literature 2: U.S. Pat. No. 9,333,427

SUMMARY OF INVENTION

Technical Problem

The toy disclosed in Patent Literature 1 has a configuration where the mobile body identifies a course shape by reading data on the traveling surface, and the player sets traveling control data to cause the mobile body to operate. However, the mobile body merely travels on the traveling path, and an operation form is limited to a certain range. An inventor of the present application has devised further diversification of operation of a robot by replacing the mobile body with the robot as application of the configuration where the mobile body reads data from the traveling surface and the mobile body is caused to operate. The inventor has devised this because the inventor considers that visual and auditory recognition which can be realized by diversifying operation of the robot and changing motion of the robot, a color, sound, or the like, will make it easier to be understood by even small children.

Further, the inventor of the present application considers that while the toy disclosed in Patent Literature 1 merely assumes play, if this toy is applied to learning, a range of use is enlarged. Particularly, if data to be read by a robot is set as input, and operation of the robot is set as output, because relationship between the input and the output is easily understood by even children, the inventor considers that this toy is effective for children to learn programming.

With the toy disclosed in Patent Literature 2, an avatar which a player causes to perform action only acts as an image on a display, and the player cannot directly touch the avatar. Therefore, it is difficult for children such as infants to manipulate the toy.

The inventor of the present application has first studied a learning toy for, for example, allowing infants aged 3 or under to learn the basics of computer programming. The inventor has considered that, for example, while it is difficult to make infants aged 3 or under understand computer language, by utilizing characteristics that a robot reads data from a traveling surface and the robot is caused to operate, it is possible to allow the infants to learn a method of computer programming. Further, the inventor has considered that even children such as infants can easily recognize operation and can learn with interest by causing a robot which is a three-dimensional object to operate rather than by causing an image on a display to operate.

Meanwhile, if target age is limited to a narrow age group such as, for example, infants aged 3 or under, operation of the learning toy cannot help but be limited to simple operation, which may bore children or which may make the learning toy get out of use in a short period of time as children grow.

To make it possible to use the learning toy over a long period of time in accordance with development stages of children, it is preferable to realize a learning toy with which learning of higher-level programming can be realized through operation of the robot.

Therefore, a problem to be solved by the present invention is to provide a toy which enables stepwise learning of high-level programming so that the toy can be intended for older children as well as younger infants.

Solution to Problem

To solve such a problem, an invention recited in claim 1 is a learning toy in which a plurality of command panels in which command information which is a command of operation for a mobile body is recorded are successively arranged, and the mobile body reads the command information while self-traveling on the command panels, and operates based on the command information, the mobile body including a moving unit to self-travel on the command panels, a reading unit to read the command information recorded in the command panels, a storage unit to store the read command information, and a control unit to cause the mobile body to operate based on the command information, respectively different pieces of the command information which can be read by the reading unit of the mobile body being recorded in a plurality of the command panels among the command panels which are successively arranged, the storage unit of the mobile body storing a plurality pieces of the read command information, and the control unit causing the mobile body to operate based on a plurality of pieces of the command information stored in the storage unit.

An invention according to claim 2 is the learning toy in which, in addition to the configuration recited in claim 1, the control unit of the mobile body changes operation of the mobile body to be performed based on the command information read later, in accordance with content of the command information read previously.

An invention according to claim 3 is the learning toy in which, in addition to the configuration recited in claim 1 or 2, the control unit of the mobile body automatically extracts a plurality of pieces of the command information from the storage unit to cause the mobile body to perform desired operation.

An invention according to claim 4 is the learning toy in which, in addition to the configuration recited in any one of claims 1 to 3, the mobile body includes a light emitting element which causes a body of the mobile body to emit light or a speaker which causes sound to be generated from the mobile body based on a plurality of pieces of the command information.

An invention recited in claim 5 is a learning toy in which a plurality of command panels in which command information which is a command of operation of a mobile body is recorded are successively arranged, and the mobile body reads the command information while self-traveling on the command panels, and operates based on the command information, the mobile body including a moving unit to self-travel on the command panels, a reading unit to read the command information recorded in the command panels, a storage unit to store the read command information, and a control unit to cause the mobile body to operate based on the command information, respectively different pieces of the command information which can be read by the reading unit being recorded in a plurality of the command panels among the command panels which are successively arranged, the respectively different pieces of the command information recorded in the plurality of command panels including first comparison target information which is constituted with one or more pieces of the command information and which includes information of a numerical value or a picture, and second comparison target information which is constituted with one or more pieces of the command information indicating the numerical value or the picture and which is to be compared with the first comparison target information to determine whether predetermined conditions are satisfied, the storage unit storing a plurality of pieces of the command information read from the plurality of command panels, the control unit detecting the first comparison target information and the second comparison target information from the plurality of pieces of the read command information, and comparing the first comparison target information with the second comparison target information to determine whether the predetermined conditions are satisfied, and causing the mobile body to perform desired operation based on a result of the determination.

An invention according to claim 6 is the learning toy in which, in addition to the configuration recited in claim 5, the first comparison target information constituted with three or more pieces of command information recorded in three or more command panels is constituted with start position command information which is the command information indicating a start position of the first comparison target information, end position command information which is the command information indicating an end position of the first comparison target information, and one or more pieces of first comparison command information which is constituted with one or more pieces of the command information recorded in one or more command panels put between two command panels in which the start position command information and the end position command information are respectively recorded, and which is to be compared with the second comparison target information to determine whether the predetermined conditions are satisfied.

An invention according to claim 7 is the learning toy in which, in addition to the configuration recited in claim 6, a plurality of pieces of the first comparison command information constituted with a plurality of pieces of the command information recorded in a plurality of the command panels put between the two command panels in which the start position command information and the end position command information are respectively recorded, and a plurality of pieces of second comparison command information which are a plurality of pieces of the command information constituting the second comparison target information are respectively constituted with a plurality of types indicating information of the numerical value or the picture, and the control unit respectively compares the plurality of pieces of the first comparison command information with the plurality of pieces of the second comparison command information for each corresponding type among the plurality of types to determine whether the predetermined conditions are satisfied.

An invention recited in claim 8 is a learning toy in which a plurality of command panels in which command information which is a command of operation of a mobile body is recorded are successively arranged, and the mobile body reads the command information while self-traveling on the command panels, and operates based on the command information, the mobile body including a moving unit to self-travel on the command panels, a reading unit to read the command information recorded in the command panels, a storage unit to store the read command information, a control unit to cause the mobile body to operate based on the command information, and a speaker to cause sound to be generated from the mobile body based on the command information, respectively different pieces of the command information which can be read by the reading unit being recorded in a plurality of the command panels among the command panels which are successively arranged, information of characters being included in the respectively different pieces of the command information recorded in the plurality of the command panels, the storage unit storing a plurality of pieces of the command information including the information of the characters read from the plurality of the command panels, and the control unit reading out the plurality of pieces of the command information including the information of the characters stored in the storage unit and causing pronunciation of a word constituted by arrangement of the information of the characters in an order read out from the plurality of the command panels to be generated from the speaker.

An invention recited in claim 9 is a learning toy in which a plurality of command panels in which command information which is a command of operation of a mobile body is recorded are successively arranged, and the mobile body reads the command information while self-traveling on the command panels, and operates based on the command information, the mobile body including a moving unit to self-travel on the command panels, a reading unit to read the command information recorded in the command panels, a storage unit to store the read command information, and a control unit to cause the mobile body to operate based on the command information, respectively different pieces of the command information which can be read by the reading unit being recorded in a plurality of the command panels among the command panels which are successively arranged, information of a picture or characters being included in respectively different pieces of the command information recorded in the plurality of the command panels, the storage unit storing a plurality of pieces of the command information including the information of the picture or the characters read from the plurality of the command panels, the control unit reading out the plurality of pieces of the command information including the information of the picture or the characters stored in the storage unit, comparing spelling of a word corresponding to the information of the picture with arrangement of the information of the characters in an order read from the plurality of the command panels to determine whether the spelling matches the arrangement, and causing the mobile body to perform desired operation based on a result of the determination.

An invention according to claim 10 is a mobile body for a learning toy to be used for the learning toy recited in any one of claims 1 to 9.

An invention according to claim 11 is a command panel for a learning toy to be used for the learning toy recited in any one of claims 1 to 9.

Advantageous Effects of Invention

According to the invention of claim 1, the storage unit provided at the mobile body stores command information read while the mobile body self-travels on the command panels, and the control unit of the mobile body causes the mobile body to operate based on a plurality of pieces of command information stored in the storage unit. Therefore, it is possible to create high-level programming such as programming in which reading of the command information and operation of the mobile body which is to be performed based on the information are performed at a time interval, as well as simple programming in which command information is sequentially read and operation of the mobile body is sequentially executed in accordance with reading of the command information. Because a difficulty level of programming can be adjusted in a stepwise manner from simple one to high-level one, older children as well as younger infants can learn with this toy. As a result, it is possible to realize usage of the toy over a long period of time in accordance with development stages of children.

According to the invention of claim 2, the operation of the mobile body which is to be performed based on the command panel to be read later changes in accordance with a type of the command panel read by the mobile body previously. Because a learner needs to take into account combination of command panels to be read first and later, the learner can learn high-level programming. Particularly, the learner can learn idea of conditional branching.

According to the invention of claim 3, the control unit of the mobile body automatically extracts a plurality of pieces of the read command information stored in the storage unit from the storage unit to cause the mobile body to perform desired operation. Therefore, it is possible to realize programming in which operation of the mobile body does not follow reading order of the command information. As a result, it becomes possible to allow designing of higher-level programming, so that it becomes possible to realize learning of higher-level programming.

According to the invention of claim 4, the mobile body includes a light emitting element which causes the body of the mobile body to emit light or a speaker which causes sound to be generated from the mobile body based on the plurality of pieces of command information. Therefore, it is possible to confirm light emission and sound generation of the mobile body in a visual and auditory manner, so that it is possible to easily verify whether the mobile body operates as designed by programming assumed by the learner. Further, it is also possible to program light emission of the mobile body while taking into account relationship of three primary colors, so that the learner can learn higher-level programming and can also learn three primary colors.

According to the invention of claim 5, the plurality of pieces of command information to be read by the mobile body from the plurality of command panels constitute the first comparison target information and the second comparison target information. The control unit of the mobile body detects the first comparison target information and the second comparison target information from a plurality of pieces of the read command information, compares the first comparison target information with the second comparison target information, determines whether the predetermined conditions are satisfied, and causes the mobile body to perform desired operation based on a result of the comparison and the determination.

Therefore, it becomes possible to create high-level programming in which the command information recorded in part of the command panels is compared with the command information recorded in other part of the command panels among the plurality of arranged command panels and the mobile body is caused to operate based on a result of the comparison and the determination, as well as simple programming in which the command information recorded in the command panels are sequentially read and operation of the mobile body is sequentially executed in accordance with reading of the command information. Because it is possible to adjust a difficulty level of programming in a stepwise manner from simple one to high-level one, older children as well as younger infants can learn with this learning toy.

Further, because the first comparison target information and the second comparison target information can be constituted to include information of numerical values, the learner can learn high-level programming in which numerical values are calculated and calculation results are compared.

As a result, this learning toy can be used over a long period of time in accordance with development stages of children.

According to the invention of claim 6, the first comparison target information is constituted with the start position command information, the end position command information, and one or more pieces of first comparison command information recorded in one or more command panels. Then, the one or more pieces of first comparison command information are compared with the second comparison target information. The one or more pieces of first comparison command information can be changed in various ways by changing the number or types of the command panels.

Therefore, the learner can learn while changing the one or more pieces of first comparison command information by changing the command panels to be arranged in various ways. In this manner, the learner can learn high-level and a variety of programming.

According to the invention of claim 7, the plurality of pieces of first comparison command information and the plurality of pieces of second comparison command information are constituted with a plurality of types indicating information of numerical values or pictures. Then, the plurality of pieces of first comparison command information are respectively compared with the plurality of pieces of second comparison command information for each corresponding type among the plurality of types.

The learner can learn while constituting the plurality of pieces of first comparison command information and the plurality of pieces of second comparison command information so as to include a plurality of types. In this manner, the learner can learn high-level and complicated programming.

According to the invention of claim 8, the mobile body reads the plurality of command panels in which the command information including the information of characters is recorded, and pronunciation of a word constituted by arrangement of the information of characters in a read order is reproduced. Therefore, the learner can learn various words and accurate pronunciation of the words by rearranging the plurality of command panels. In this manner, the learner can learn high-level programming including learning regarding words.

According to the invention of claim 9, the mobile body reads the plurality of command panels in which the command information including information of a picture or characters is recorded, spelling of a word corresponding to the information of a picture is compared with arrangement of the information of characters in a read order, whether or not the spelling matches the arrangement is determined, and the mobile body performs desired operation based on a result of the determination. Therefore, the learner can recognize whether the spelling of the word corresponding to the picture matches the arrangement of characters constituted by a plurality of command panels being arranged, through operation of the mobile body. The learner can learn accurate spelling of the word by rearranging the plurality of command panels. In this manner, the learner can learn high-level programming including learning regarding spelling of words.

According to the invention of claim 10, the mobile body for a learning toy can restrict or allow an application range of the command information which becomes effective as operation to be programmed. Therefore, it is possible to realize learning of programming in accordance with development stages of learners.

According to the invention of claim 11, because, in the command panel for a learning toy, types of the command information to be recorded can be increased, it is possible to command the mobile body to perform a wider variety of operation. As a result, it is possible to realize learning of high-level and a variety of programming. Further, because a command panel for a learning toy can be sold alone, the learner can additionally purchase a command panel for a learning toy as necessary.

BRIEF DESCRIPTION OF DRAWINGS

FIG. 2 is a view schematically illustrating a mobile robot according to the embodiment.

FIG. 13 is a plan view illustrating an example of the command panel according to the embodiment.

DESCRIPTION OF EMBODIMENT

Embodiment of Invention

An embodiment of the present invention will be described using FIG. 1 to FIG. 15.

Figure 1:
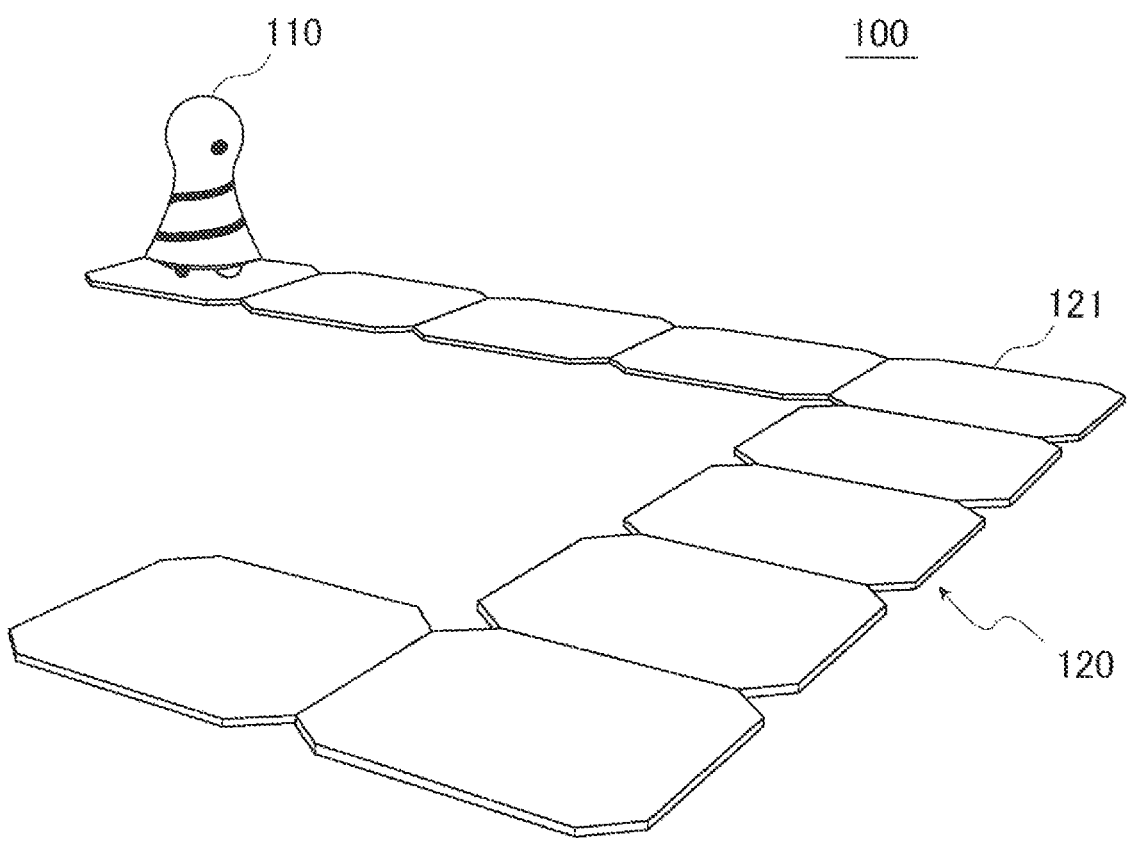
FIG. 1 is a perspective view schematically illustrating an overall configuration of a learning toy according to an embodiment of the present invention.

As illustrated in FIG. 1, a learning toy 100 according to the embodiment is configured with one mobile robot 110 as a "mobile body" and a plurality of command panels 121. Further, the plurality of command panels 121 are successively arranged to form a movement path 120. In these command panels 121, different pieces of command information which are commands of operation of the mobile robot 110 are recorded. A learner sequentially arranges the plurality of command panels 121 to form an arbitrary movement path 120 in accordance with operation which the learner wants the mobile robot 110 to perform. The mobile robot 110 reads the command information recorded in the command panels 121 while self-traveling on these command panels 121, and perform various kinds of operation based on the command information.

<Mobile Robot>

The mobile robot 110 according to the embodiment includes a moving mechanism 230 which is a "moving unit" to self-travel, an optical reading module 240 which is a "reading unit" to read the command information of the command panels 121, a command information memory 508 (see FIG. 4) which is a "storage unit" to store a plurality of pieces of the read command information, and a control unit 501 (see FIG. 4) which is a "control unit" to cause the mobile robot 110 to operate. Further, an RGB light source 502 (see FIG. 4) which is a "light emitting element" to cause this mobile robot 110 to emit light and a speaker 507 (see FIG. 4) which causes sound to be generated from this mobile robot 110 are incorporated into the mobile robot 110. Further, functions of the mobile robot 110 are not limited to these, and other functions may be added.

Figure 2A:
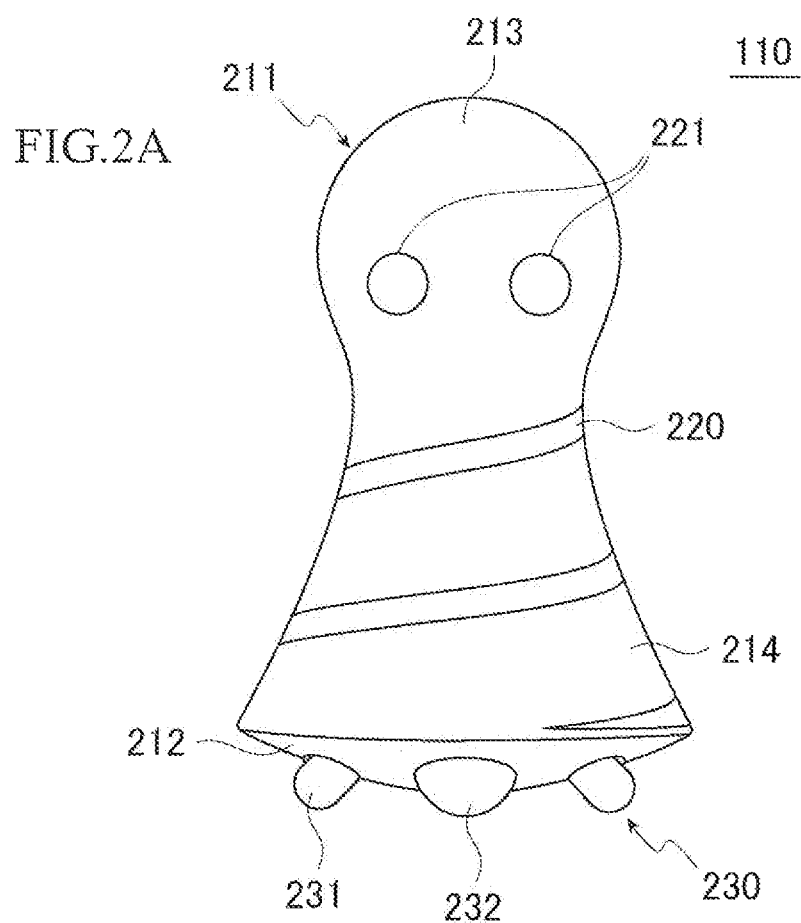
FIG. 2A is a front view.
Figure 2B:
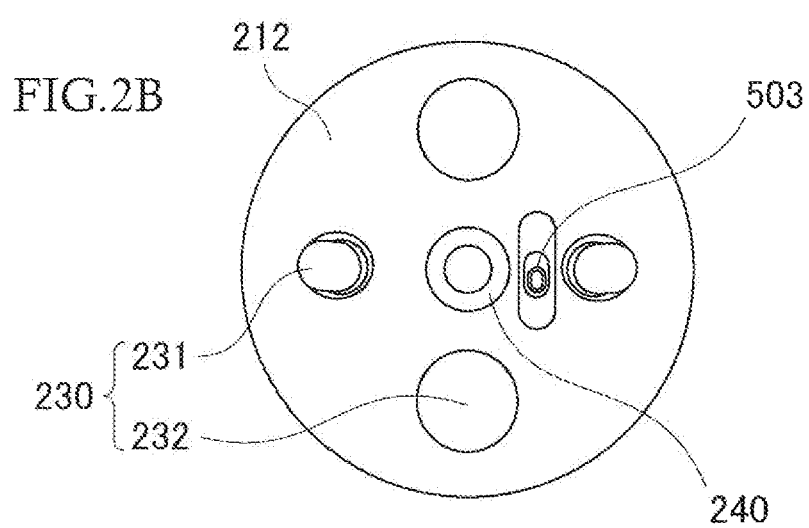
FIG. 2B is a bottom view.

FIG. 2A and FIG. 2B illustrate brief appearance of this mobile robot 110, which includes a body portion 211 and a bottom portion 212. The mobile robot 110 has a structure in which the body portion 211 and the bottom portion 212 are detachable. A light emitting portion 220 is formed around the body portion 211 in a spiral shape. Further, two front circular portions 221 are provided as design which imitates the eyes in the face. At the bottom portion 212, the moving mechanism 230, the optical reading module 240, a power supply switch 503, or the like, are provided.

The body portion 211 is preferably formed with a material with high safety such as, for example, a resin, and is formed with combination of a spherical portion 213 and a conical portion 214. However, this body portion 211 may have an arbitrary shape, size, or the like.

The light emitting portion 220 is formed with a material with high safety such as, for example, a transparent resin. By the RGB light source 502 (for example, using an LED, not illustrated in FIG. 1 and FIG. 2) provided within the body portion 211 emitting light, it is configured such that it seems as if this light emitting portion 220 emitted light. It is possible to cause the light emitting portion 220 of the mobile robot 110 to emit light in an arbitrary color through combination of light of red, green and blue emitted from the RGB light source 502. In the present embodiment, while the shape of the light emitting portion 220 is made a spiral shape, this light emitting portion 220 may have an arbitrary shape.

Figure 3:
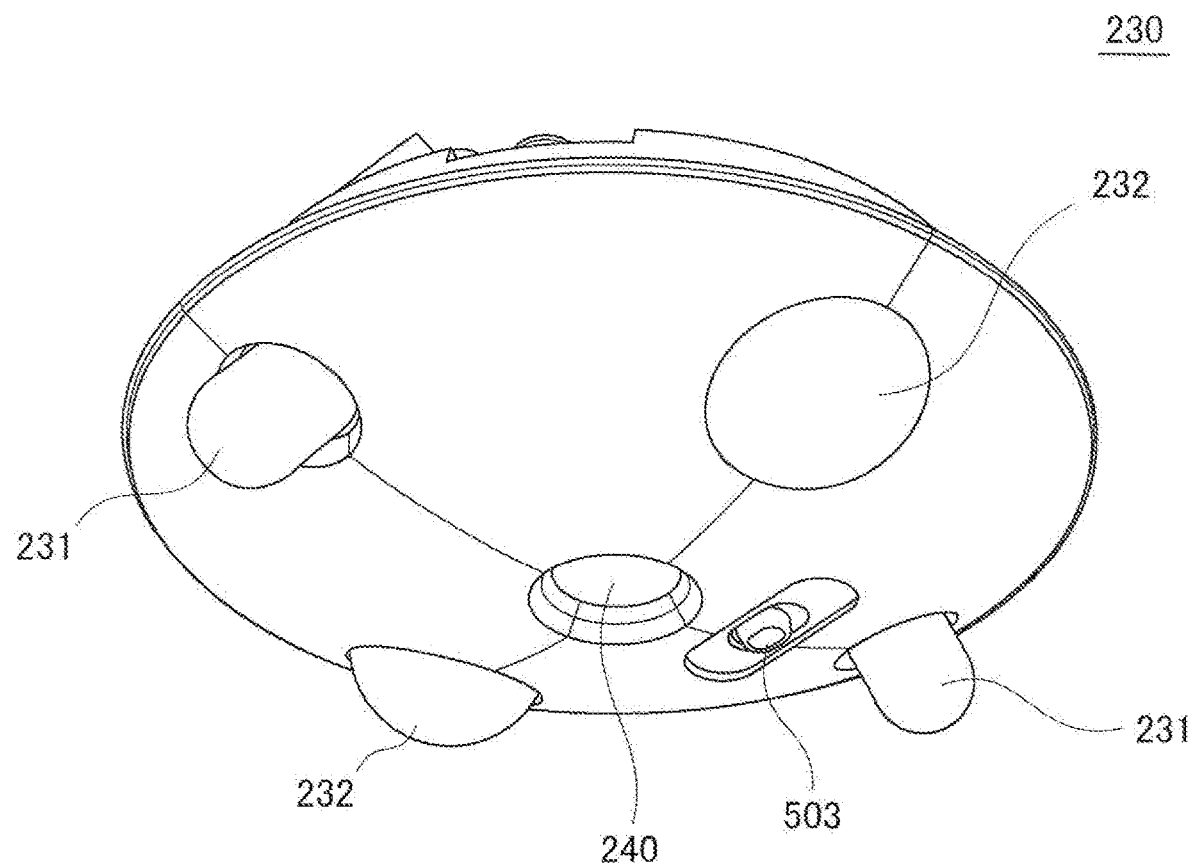
FIG. 3 is a schematic perspective view of a traveling mechanism of the mobile robot according to the embodiment, seen from a lower side.

The bottom portion 212 is preferably formed with a material with high safety such as, for example, a resin, and has a convex surface which projects downward. However, the bottom portion 212 may have an arbitrary shape, or the like. FIG. 3 illustrates the moving mechanism 230 disposed at the bottom portion 212 in a state where the bottom portion 212 is removed from the body portion 211. FIG. 3 is a perspective view seen from obliquely below.

The moving mechanism 230 is a mechanism for causing this mobile robot 110 to move, rotate, or the like. This moving mechanism 230 includes a pair of rotating legs 231 and a pair of auxiliary balls 232 as illustrated in FIG. 2 and FIG. 3.

The pair of rotating legs 231 are disposed to project from portions near an outer edge of the bottom portion 212 in a state where the rotating legs 231 tilt outward. These rotating legs 231 are disposed at positions symmetric across the center of the bottom portion 212. Spherical surfaces formed at tips of these rotating legs 231 abut on a floor surface. These rotating legs 231 are respectively connected to drive shafts (not illustrated) of a pair of motors 401 (see FIG. 4) disposed inside the body portion 211, and rotationally driven by these drive shafts.

The pair of auxiliary balls 232 is provided so as to freely rotate near the outer edge of the bottom portion 212 in a state where the auxiliary balls 232 project from this bottom portion 212. That is, these auxiliary balls 232 are merely held with holding members (not illustrated) provided on an upper side of the bottom portion 212 and do not have drive force. Further, the auxiliary balls 232 are reliably held inside the body portion 211. Because measures for safety are taken so that the auxiliary balls 232 never come out from pore diameters of the bottom portion 212 to outside, the auxiliary balls 232 never drop off, so that the learner can learn at ease. Further, these auxiliary balls 232 are disposed at positions respectively approximately 90° from the rotating legs 231 in bottom surface view (see FIG. 2B), and disposed at height so as to abut on the floor surface at the same time as these rotating legs 231 (see FIG. 2A).

By the rotating legs 231 and the auxiliary balls 232 being disposed in this manner, it is possible to place the body portion 211 of the mobile robot 110 on the floor surface in a stable state without the body portion 211 tilting, and it is possible to realize smooth operation such as movement and rotation of the mobile robot 110. However, the moving mechanism 230 may have an arbitrary specific structure, and may have any structure if operation of moving forward and rotation can be performed.

The mobile robot 110 can go straight ahead, rotate, turn right, turn left, or the like, by individually performing rotation control of the pair of rotating legs 231. For example, in a case where it is desired to make the mobile robot 110 go straight ahead, it is only necessary to rotate the pair of rotating legs 231 in the same direction at the same rotation speed. Meanwhile, in a case where it is desired to rotate the mobile robot 110 on the spot without moving, it is only necessary to rotate the pair of rotating legs 231 in opposite directions at the same rotation speed. Further, if the pair of rotating legs 231 are all stopped, the moving mobile robot 110 stops.

The mobile robot 110 reads the command information recorded in the command panel 121 in a state where the mobile robot 110 is on the command panel 121, and performs desired operation based on the read command information.

The optical reading module 240 of the mobile robot 110 is attached to a portion of a central position of the bottom portion 212 to face downward as illustrated in FIG. 2 and FIG. 3, and can read the command panel 121 which is located immediately below the optical reading module 240.

The optical reading module 240 is configured to be able to optically read the command information recorded in the command panel 121 using a scheme which uses a two-dimensional dot pattern which is a "two-dimensional pattern" (Japanese Patent No. 3829143, Japanese Patent No. 4054339).

A two-dimensional dot pattern which corresponds to the command information on a one-to-one basis is printed on a surface of the command panel 121, and an optical sensor in two-dimensional array which is incorporated into this optical reading module 240 is configured to be able to optically detect an image of this dot pattern. Further, because the two-dimensional dot pattern is provided to have directionality, a direction of the mobile robot 110 with respect to the command panel 121 can be detected from this image. Still further, the two-dimensional dot pattern is small and printed so as not to be prominent.

With this scheme which uses a two-dimensional dot pattern, because it is possible to record a sufficiently large volume of data in the command panel 121, and it is possible to add the two-dimensional dot pattern in a state where the two-dimensional dot pattern is difficult to be visually recognized, this method is suitable as a method for the optical reading module 240 to read the command panel 121.

Note that the method for adding the command information to the command panel 121 is not particularly limited. For example, a method of optically reading a two-dimensional code such as a barcode and a QR code (registered trademark), or the like, a method of magnetically recording information, a method of using an IC (Integrated Circuit) chip, or the like, or other methods may be used. Further, the command information may be added to the surface of the command panel 121 through printing, or the like, or may be added to inside or back side of the command panel 121. That is, any method may be used if the mobile robot 110 can read the command information when the mobile robot 110 is located on the command panel 121.

The power supply switch 503 of the mobile robot 110 is a switch for powering on or off the mobile robot 110. The power supply switch 503 may be disposed at a portion other than the bottom portion 212, or may be eliminated. Further, any kinds of switch may be used as the power supply switch 503.

Figure 4:
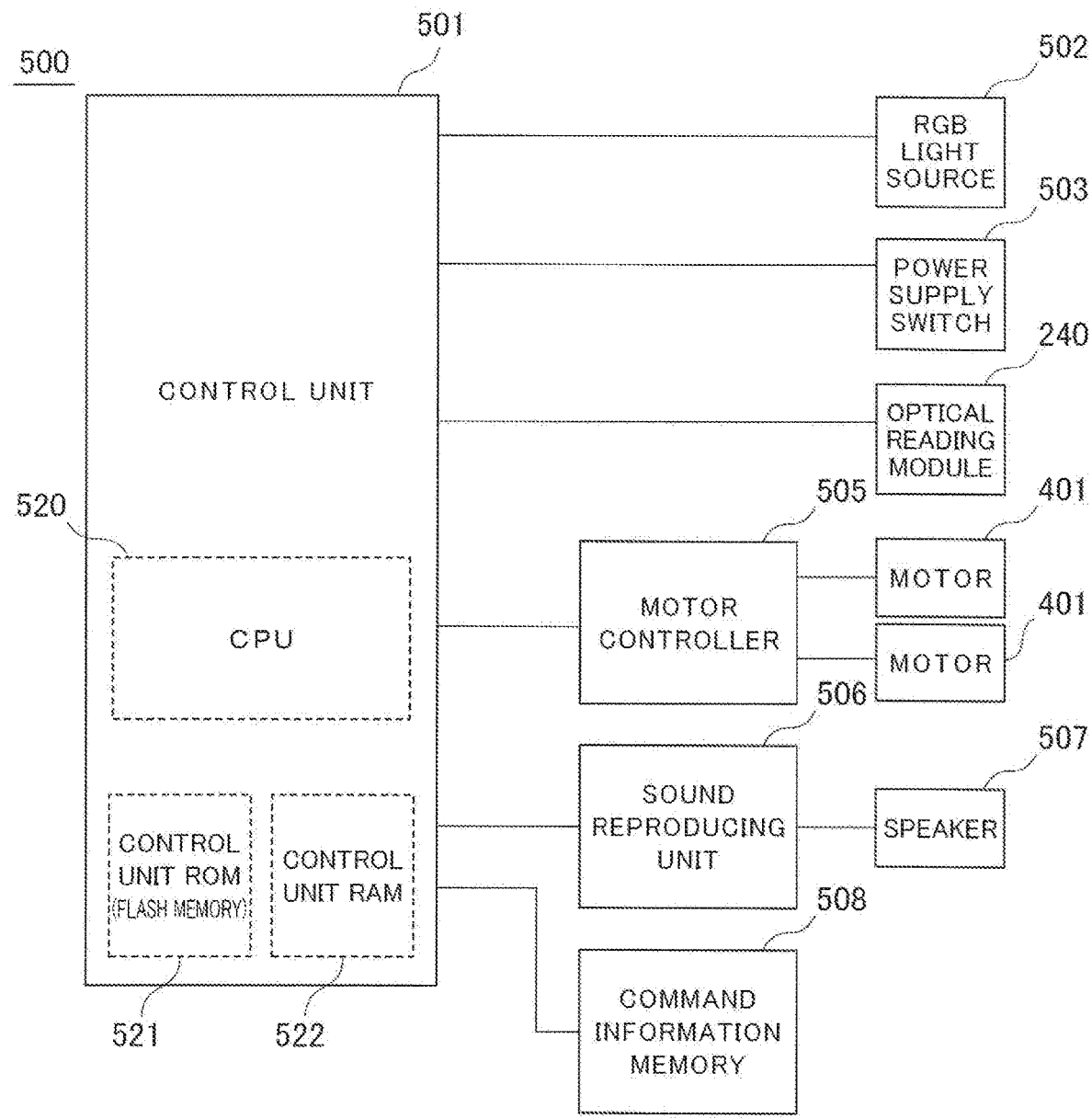
FIG. 4 is a block diagram schematically illustrating a control circuit of the mobile robot according to the embodiment.

The control circuit 500 as illustrated in FIG. 4 is disposed at the body portion 211 of the mobile robot 110.

As illustrated in FIG. 4, this control circuit 500 includes the control unit 501, and the RGB light source 502, the power supply switch 503, the optical reading module 240, a motor controller 505, a sound reproducing unit 506 and the command information memory 508 are connected to this control unit 501.

The control unit 501 is configured with a CPU (Central Processing Unit) 520 which performs processing in accordance with a program that controls connected electronic components, a control unit ROM (Read Only Memory) (flash memory) 521 which holds a program and data for causing the CPU 520 to operate, a control unit RAM (Random Access Memory) 522 which temporarily holds data necessary for operation of the CPU 520, or the like. A flash memory is used as the control unit ROM (flash memory) 521, and an SRAM (Static Random Access Memory) is used as the control unit RAM 522. Note that other kinds of memories such as an EEPROM (Electrically Erasable Programmable Read-Only Memory) may be used as the control unit ROM (flash memory) 521. The flash memory and the EEPROM are a non-volatile memory in which data can be electrically rewritten, and the data is stored even if the mobile robot 110 is powered off. The flash memory is also called a flash ROM. Further, the SRAM is a volatile memory from which data is erased if the mobile robot 110 is powered off. Note that other kinds of memories other than the SRAM may be used as the control unit RAM 522.

The control unit 501 causes the mobile robot 110 to execute operation by controlling the RGB light source 502, the motor controller 505 and the sound reproducing unit 506 based on the command information received from the optical reading module 240.

As described above, the RGB light source 502 causes the light emitting portion 220 of the mobile robot 110 to emit light in a predetermined color based on control by the control unit 501. This RGB light source 502 is configured with LEDs of red, green and blue.

The power supply switch 503 is a switch for powering on/off the mobile robot 110, but is not essential. This power supply switch 503 is preferably disposed at a location of the body portion 211 or the bottom portion 212 of the mobile robot 110, where the power supply switch 503 is not prominent.

The optical reading module 240 detects the command information and a direction of the mobile robot 110 with respect to the command panel 121 from the read optical information and transmits the command information and the direction to the control unit 501.

The motor controller 505 drives a pair of motors 401 based on control by the control unit 501. As described above, rotation speed and rotation directions of these motors 401 are individually determined in accordance with the command information of the corresponding command panel 121.

A speaker 507 for reproducing speech and sound is provided at the mobile robot 110. The speaker 507 is configured to generate scales of music notes, sound expressing timbre of instruments, cry of animals, or the like, based on the command information.

The sound reproducing unit 506 causes the speaker 507 to reproduce sound based on control by the control unit 501. Types, scales, or the like, of sound to be reproduced by the speaker 507 are determined based on the command information of the corresponding command panel 121.

The command information memory 508 stores a plurality of pieces of command information read by the optical reading module 240 and transmitted from this optical reading module 240 to the control unit 501. When the mobile robot 110 reaches a central portion on the command panel 121, the control unit 501 causes the command information read from the command panel 121 to be stored in the command information memory 508. Further, the mobile robot 110 causes all of a plurality of pieces of command information of the command panels 121 through which the mobile robot 110 has passed to be stored in the command information memory 508. Note that the mobile robot 110 may cause part of the plurality of pieces of command information of the command panels 121 through which the mobile robot 110 has passed to be stored in the command information memory 508.

Further, the mobile robot 110 causes the plurality of pieces of command information of the command panels 121 through which the mobile robot 110 has passed to be successively stored in storage regions in an order of address of the command information memory 508. Note that the mobile robot 110 may cause the whole clump of related command information to be stored in the storage region while dividing the address of the command information memory 508 for each piece of the related command information of the command panels 121 through which the mobile robot 110 has passed.

The command information memory 508 is configured with an SRAM, or the like. However, the command information memory 508 is not limited to an SRAM, and other volatile memories such as a RAM, or non-volatile memories such as an EEPROM and a flash memory can be used.

Further, the command information memory 508 does not have to exist separately from the control unit RAM 522 which temporarily stores data for processing of the CPU 520 of the control unit 501, and functions of the command information memory 508 can be realized by the control unit RAM 522. Such a configuration has advantages of reducing cost, reducing an area of an electronic substrate, or the like. Of course, it is also possible to cause the control unit ROM (flash memory) 521 which holds data to realize functions of the command information memory 508. In this case, because the command information is stored in a non-volatile memory, it is possible to take out the command information read last time even after the mobile robot 110 is powered off and powered on again. It is possible to realize programming which reflects past command information in operation of the mobile robot 110 which is being executed by storing the command information.

The control unit 501 can take out the command information stored in the command information memory 508 in an arbitrary order regardless of a storage order. Therefore, it is possible to take out a plurality of pieces of command information from positions in an arbitrary storage order in the command information memory 508 to cause the mobile robot 110 to execute operation. As a result, it is possible to create high-level programming such as programming in which reading of the command information and operation of the mobile robot 110 to be performed based on the read command information are performed at a time interval, as well as simple programming in which the command information is sequentially read and operation of the mobile robot 110 is caused to be executed in accordance with the command information. Further, it is also possible to set information regarding an execution order in advance and cause operation of the mobile robot 110 based on the read command information to be performed in accordance with the order information.

Further, if command information necessary for operation of the mobile robot 110 is stored in the command information memory 508, the control unit 501 can automatically extract and take out the command information. Therefore, it is possible to realize programming in which operation of the mobile robot 110 does not follow a reading order of the command information.

In addition to such a control circuit 500, a battery (not illustrated), or the like, are also held in the body portion 211. A type of the battery is not limited, and, for example, the battery may be a dry cell, a rechargeable battery, or the like.

Note that, while not illustrated in FIG. 4, it is also possible to connect an acceleration sensor, a microphone for sound recording, or the like, to the control circuit 500, and cause the mobile robot 110 to execute more complicated operation.

<Command Panel>

The command panel 121 will be described next.

The command panel 121 has a shape in which corner portions of a square plate are cut out. By the command panel 121 having the shape in which the corner portions of the square are cut out, even if the command panels 121 are tightly arranged in a planar shape, because voids through which a finger can enter are formed at portions of the corner portions of the command panels 121, an advantage is provided that even the command panel 121 arranged inside a plane can be easily taken out. Further, because an angle of the corner portion becomes an obtuse angle, even if the command panel 121 drops and the corner portion is hit, the command panel 121 is less likely to be broken, and it is possible to prevent children from getting injured, such as getting scratched.

Further, magnets are embedded into both end portions of plate end faces on four surfaces of the command panel 121 such that polarity becomes opposite to each other. By the magnets being embedded into the plate end faces in this manner, if two command panels 121 are arranged adjacent to each other, because the facing plate end faces attract each other with the magnets, the command panels 121 are not misaligned in a longitudinal direction of the plate end face, and tightly contact with each other, so that the stable movement path 120 of the mobile robot 110 is formed.

Further, the command panel 121 is preferably formed with a material with high safety, such as, for example, a resin.

For example, the command panel 121 can be formed with plastic such as an ABS resin. Examples of a form of the command panel 121 in this case can include an inflexible cured molded item with a thickness of approximately several millimeters, or the like.

However, the command panel 121 can be also formed with a plastic sheet, paper, or the like. By using a flexible material, because the command panel 121 can be folded, an advantage is provided that the command panel 121 can be stored in small space. Further, an advantage is provided that the command panel 121 can be formed at low cost.

In a case where the command panel 121 is formed with a plastic sheet or paper, a plurality of command panels each having a size of one command panel 121 may be prepared. Further, one large sheet including a plurality of command panels 121 formed with a plastic sheet or paper may be prepared by pasting command panels each having a size of one command panel 121 on one large sheet so that the command panels are tightly paved in a plane. In this case, the learner spreads out the one large sheet on a floor to use the sheet when learning using this learning toy 100.

For example, the command panels 121 formed with a plastic sheet or paper may be pasted on one large sheet so that a planar region is constituted by seven command panels in a row direction and seven command panels in a column direction being paved and arranged.

The number of command panels 121 to be pasted on one large sheet is arbitrary, and, the sheet may be constituted at a size other than a size having a range of seven rows and seven columns, or a region formed by a plurality of command panels 121 being pasted may constitute a shape other than a square.

One large sheet on which the command panels 121 are to be pasted can be created using a plastic sheet or paper.

Further, as well as a form in which the command panels 121 are pasted on a large sheet one by one, one large sheet formed with a plastic sheet or paper on which a plurality of command panels 121 which are paved and arranged in a plane, are printed in advance, may be used.

In a case where the command panels 121 are printed, it is impossible to arbitrarily change arrangement of the command panels 121 on one large sheet. However, in a case where basic learning which makes the learner recognize relationship between the command panels 121 and operation of the mobile robot 110 to be performed based on the command panels 121 is repeatedly performed, this form is effective.

Further, it is also possible to prepare a plurality of types of sheets with varied types and arrangement of the command panels 121 printed on one large sheet. By this means, the operation of the mobile robot 110 changes in various manners by exchanging one large sheet. Therefore, the learner can learn a number of patterns concerning relationship between the command panels 121 and the operation of the mobile robot 110 to be performed based on the command panels 121.

Further, in a case where the command panel 121 is formed with a plastic sheet or paper, command panels each having a size of one command panel 121 may be pasted so that the command panels are tightly paved and arranged in a plane on a floor.

As a flexible material or an inexpensive material, other materials such as cloth may be used as well as a plastic sheet and paper.

<Two-Dimensional Dot Pattern>

A two-dimensional dot pattern printed on the command panel 121 will be described next.

In the command panels 121, different pieces of command information are respectively recorded. As described above, a two-dimensional dot pattern corresponding to the command information is printed on a surface of the command panel 121, and is detected by the optical reading module 240.

The two-dimensional dot pattern is, for example, constituted with 36 dots of six dots in a row direction and six dots in a column direction. The number of dots constituting the two-dimensional dot pattern is not limited to 36, and may be other number of dots. For example, in a case where one dot expresses one bit, if the number of bits necessary for constituting the learning toy 100 is 24 bits, the number of dots constituting the two-dimensional dot pattern may be, of course, set at 24. The two-dimensional dot pattern constituted with 36 dots is optically read with an optical sensor in two-dimensional array which is incorporated into the optical reading module 240, and image data of this dot pattern is processed. By this means, information recorded in the two-dimensional dot pattern can be detected. Because a small sensor with a small pixel size is employed as the optical sensor in two-dimensional array of the optical reading module 240, even if a size of a dot and an interval of dots are made smaller, the two-dimensional dot pattern can be detected. Therefore, the size of the two-dimensional dot pattern is made small. By this means, the two-dimensional dot pattern becomes less prominent. Further, because a plurality of two-dimensional dot patterns can be read at one time with the optical reading module 240, even if part of the surface of the command panel 121 is smeared, it is possible to prevent a situation where it is impossible to perform reading, by detecting the two-dimensional dot patterns at a portion which is not smeared.

Further, a large volume of data can be recorded in the two-dimensional dot pattern which is used. Therefore, it is possible to record further larger data which exceeds the number of types of command information recorded in the command panel 121.

Therefore, information is added to the two-dimensional dot pattern so that not only the command information recorded in the command panel 121 but also a position on the surface of the command panel 121 and a direction determined in advance on the surface of the command panel 121 can be detected by utilizing characteristics of the two-dimensional dot pattern which can record a large volume of data.

<Command Panel and Operation of Mobile Robot>

A usage method of this learning toy 100 will be described next. The learner arranges a plurality of command panels 121 and causes the mobile robot 110 to travel on the command panels 121.

Because the command information cannot be directly recognized by the learner, a picture indicating operation of the mobile robot 110 based on the command information is drawn on the command panel 121, so that the learner can recognize the command information through this picture. The picture drawn on the command panel 121 is preferably a picture which gives the learner an image of the command information.

Further, the same command information may be recorded by the same picture being printed on the surface and the back side of the command panel 121, or different pieces of command information may be recorded by different pictures being printed.

The pictures drawn on the command panels 121 and operation of the mobile robot 110 based on the command information corresponding to the pictures will be described below.

FIG. 5 illustrates pictures of part of the command panels 121. Display of the pictures in FIG. 5 is an example, and the command information may be displayed using pictures other than these pictures.

Figure 5A:
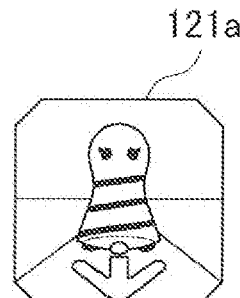
FIG. 5 is a plan view illustrating a plurality of examples of a command panel according to the embodiment. See FIGS. 5A, 5B, 5C, 5D, 5E, 5F, 5G, 5H, 5I, 5J, 5K, 5M.

A command panel 121a illustrated in FIG. 5A is a panel including command information for causing the mobile robot 110 to start movement, and is arranged at a start point of the movement path 120.

When the learner puts the mobile robot 110 on the movement path 120 and causes the mobile robot 110 to start, a case is also assumed where the learner causes the mobile robot 110 to start from a position other than this command panel 121a. In such a case, it is also possible to cause the mobile robot 110 to generate notification sound to inform the learner that the mobile robot 110 is not caused to start from a correct position.

The learner can learn that it is necessary to cause processing of the program to be correctly executed from the start position by recognizing this notification sound.

Figure 5B:
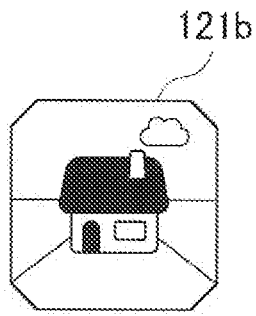

A command panel 121b illustrated in FIG. 5B includes command information for causing the mobile robot 110 to stop movement, and is arranged at a goal point of the movement path 120. Note that it is also possible to cause the mobile robot 110 to perform a plurality of types of operation based on the command information included in one command panel 121b, for example, causing the mobile robot 110 to reproduce fanfare sound and causing the light emitting portion 220 of the mobile robot 110 to emit light at the same time as causing the mobile robot 110 to stop.

Figure 5C:
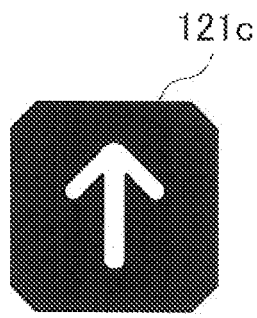

A command panel 121c includes command information for determining the traveling direction of the mobile robot 110 (see FIG. 5C). For example, in a case where this command panel 121c is arranged so that a direction of an arrow printed on this command panel 121c is the same direction as the traveling direction of the mobile robot 110, the mobile robot 110 goes straight ahead. Meanwhile, in a case where this command panel 121c is arranged so that the direction of the arrow printed on this command panel 121c points a right direction, the mobile robot 110 turns right at a central portion on this command panel 121c. In a similar manner, in a case where this command panel 121c is arranged so that the direction of the arrow printed on this command panel 121c points a left direction, the mobile robot 110 turns left at the central portion on this command panel 121c.

Figure 5D:
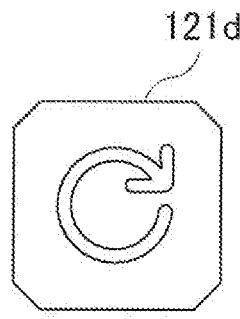

A command panel 121d includes command information for causing the mobile robot 110 to rotate one revolution on the command panel 121d (see FIG. 5D).

Figure 5E:
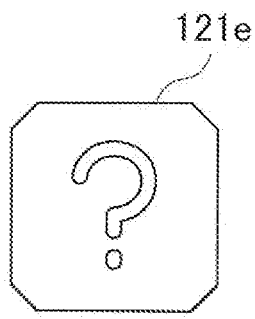

A command panel 121e is called a random panel, and operation which is caused to be performed by the mobile robot 110 is not determined in advance (see FIG. 5E). When the mobile robot 110 reaches a central portion on this command panel 121e, the control unit 501 of the mobile robot 110 generates a random number and causes the mobile robot 110 to operate based on the generated random number.

Figure 5F:
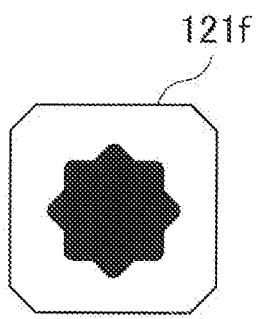

A command panel 121f includes command information for causing the light emitting portion 220 of the mobile robot 110 to emit light in a predetermined color (see FIG. 5F). For example, in a case where a color of a picture printed on this command panel 121f is magenta, when the mobile robot 110 reaches a central portion on this command panel 121f, the light emitting portion 220 of the mobile robot 110 emits light in magenta. Meanwhile, in a case where a color of a picture of this command panel 121f is blue, the light emitting portion 220 emits light in blue. In this manner, it is possible to set a color of light to be emitted from the light emitting portion 220 in accordance with the color of the picture. The color of light to be emitted from the light emitting portion 220 can be switched every time the mobile robot 110 passes through the central portion on this command panel 121f on which the picture is printed with different colors. This switching corresponds to "change of clothes" of the mobile robot 110.

If the mobile robot 110 reaches the central portion on this command panel 121f, the control unit 501 causes the optical reading module 240 to read the command information from the command panel 121f. The control unit 501 then causes the read command information which causes the light emitting portion 220 to emit light in a predetermined color to be newly added and stored in the command information memory 508, and causes the RGB light source 502 to emit light in the predetermined color.

Figure 5G:
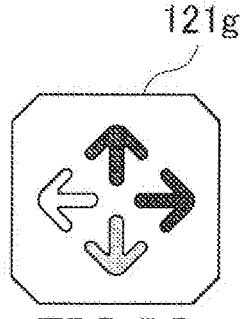

A command panel 121g includes command information for causing the mobile robot 110 to determine the traveling direction of the mobile robot 110 in accordance with the color of light emitted by the light emitting portion 220 (see FIG. 5G). On a surface of this command panel 121g, four arrows are printed toward four directions from the central portion, and an upward arrow is displayed in blue, a leftward arrow is displayed in yellow, a downward arrow is displayed in green, and a rightward arrow is displayed in magenta. For example, in a case where the mobile robot 110 goes into the command panel 121g from a point side of a yellow arrow printed on this command panel 121g, travels in a direction in which an arrow in magenta points, and reaches a central portion on this command panel 121g, it is possible to determine the traveling direction of the mobile robot 110 such that if the light emitting portion 220 emits light in magenta, the mobile robot 110 goes straight, if the light emitting portion 220 emits light in green, the mobile robot 110 turns right, if the light emitting portion 220 emits light in yellow, the mobile robot 110 goes backward, and if the light emitting portion 220 emits light in blue, the mobile robot 110 turns left. While the mobile robot 110 may travel in any direction among four arrows printed on this command panel 121g, in which direction the mobile robot 110 travels is determined based on a color of the picture of the command panel 121f through which the mobile robot 110 has passed beforehand, and which causes the light emitting portion 220 to emit light.

Note that, in a case where the light emitting portion 220 emits light in a color other than blue, yellow, magenta and green displayed as colors of arrows in four directions on this command panel 121g, the mobile robot 110 goes straight regardless of the arrow on this command panel 121g. For example, in a case where the light emitting portion 220 emits light in red, because the color of red does not match any of the colors of the arrows on this command panel 121g, the mobile robot 110 goes straight regardless of the arrow.

When the mobile robot 110 reaches the central portion on this command panel 121g, the control unit 501 causes the optical reading module 240 to read command information from the command panel 121g. The control unit 501 causes the read command information for determining the traveling direction of the mobile robot 110 in accordance with a color of light emitted by the light emitting portion 220 to be newly added and stored in the command information memory 508, and sequentially reads out the command information which has already been stored in the command information memory 508 in reverse chronological order. Then, when the command information recorded in the command panel 121f for causing the light emitting portion 220 to emit light in a predetermined color is read out, because the control unit 501 can detect a color of light emitted by the light emitting portion 220 at that time point, the control unit 501 finishes reading out the command information from the command information memory 508. By the command panel 121 being read as described above, it is possible to detect a direction of the mobile robot 110 with respect to the command panel 121 along with the command information. Therefore, the control unit 501 can detect a direction of an arrow printed on this command panel 121g whose color matches a color of light emitted by the light emitting portion 220. Thereafter, the control unit 501 controls the motor controller 505 to move the mobile robot 110 in a direction of an arrow whose color matches the color of light emitted by the light emitting portion 220.

In this manner, through combination of a plurality of command panels 121 including the command panel 121f which causes the light emitting portion 220 to emit light in a predetermined color and the command panel 121g which determines the traveling direction of the mobile robot 110 in accordance with a color of light emitted by the light emitting portion 220, operation of the mobile robot 110 is determined. That is, the control unit 501 changes the operation of the mobile robot 110 to be performed based on the command information of the command panel 121g read later in accordance with the command information of the command panel 121f read previously. Therefore, the learner can change the traveling direction of the mobile robot 110 by selecting a color of the picture of the command panel 121f which causes the light emitting portion 220 to emit light. This command panel 121g for determining the traveling direction of the mobile robot 110 in accordance with the color of light emitted by the light emitting portion 220 corresponds to an 'IF' sentence (that is, a branch instruction) in programming language, and the learner can learn conditional branching of programming.

Here, for example, in a case where, although the command panel 121*f* for causing the light emitting portion 220 of the mobile robot 110 to emit light in blue is arranged in front of the command panel 121*g*, the command panel 121 is not arranged on a left side (that is, a direction in which the mobile robot 110 travels upon emission of light in blue) of the command panel 121*g* for determining the traveling direction, this mobile robot 110 deviates from the movement path 120. In such a case, the mobile robot 110 is caused to perform error operation. As the error operation, for example, it is possible to employ operation of stopping movement while producing error sound when the mobile robot 110 deviates from the movement path 120.

Further, for example, in a case where the mobile robot 110 reaches the command panel 121*g* for determining the traveling direction although the mobile robot 110 does not pass through the command panel 121*f* for causing the light emitting portion 220 to emit light, the mobile robot 110 may be caused to perform error operation. As the error operation, for example, the mobile robot 110 may be caused to perform operation of stopping at the central portion on this command panel 121*g* and producing error sound. To detect that the mobile robot 110 does not pass through the command panel 121*f* for causing the light emitting portion 220 to emit light, it is only necessary for the control unit 501 to sequentially read out the command information stored in the command information memory 508, in reverse chronological order and judge that the command information stored in the command panel 121*f* for causing the light emitting portion 220 to emit light is not read out even if all the command information is read out.

Figure 5H:
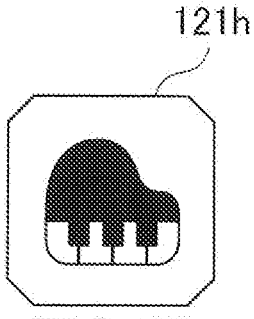

A command panel 121*h* includes command information for causing the mobile robot 110 to set an instrument of reproduction sound. On this command panel 121*h*, a picture of a piano as illustrated in FIG. 5H is drawn, and piano sound is set as the reproduction sound. Further, in addition to this command panel 121*h*, the command panels 121*h* on which pictures of a xylophone, a trumpet and an accordion are drawn, and which cause the mobile robot 110 to set sound of respective instruments as the reproduction sound, are also prepared. Note that, it is, of course, possible to provide the command panels 121*h* for setting instruments other than these instruments. When the mobile robot 110 reaches a central portion on this command panel 121*h*, the control unit 501 causes the optical reading module 240 to read command information from the command panel 121*h*. The control unit 501 causes the read command information for setting an instrument of reproduction sound to be newly added and stored in the command information memory 508, and controls the sound reproducing unit 506 to reproduce piano sound from the speaker 507 for notifying the learner that a piano is set as the reproduction sound.

Figure 5I:
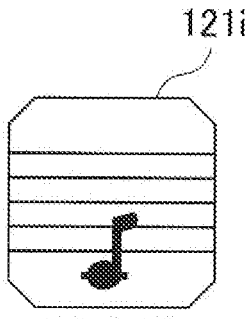

A command panel 121*i* includes command information for causing the mobile robot 110 to output reproduction sound of a predetermined scale. FIG. 5I illustrates an example where a picture expressing 'do' with staff notation and a music note is drawn, and a reproduction scale of this command panel 121*i* is 'do'. When the mobile robot 110 reaches a central portion on this command panel 121*i*, a scale of 'do' is reproduced from the speaker 507. At this time, in a case where the mobile robot 110 has passed through the command panel 121*h* for setting an instrument of reproduction sound before passing through this command panel 121*i*, a scale of the picture printed on this command panel 121*i* is reproduced with timbre of the set instrument. The timbre of the scale to be reproduced on this command panel 121*i* by the mobile robot 110 can be reproduced with timbre of an instrument such as a piano, a xylophone, a trumpet and an accordion, which can be set at the command panel 121*h*. Selection of timbre of an instrument with which a scale is to be reproduced is determined based on the instrument of the picture printed on the command panel 121*h* for setting an instrument of reproduction sound, through which the mobile robot 110 has passed beforehand.

When the mobile robot 110 reaches the central portion on this command panel 121*i*, the control unit 501 causes the optical reading module 240 to read command information from the command panel 121*i*. The control unit 501 causes the read command information for outputting reproduction sound of a predetermined scale to be newly added and stored in the command information memory 508, and sequentially reads the command information which has already been stored in the command information memory 508 in reverse chronological order. Then, when the command information recorded in the command panel 121*h* for setting an instrument of reproduction sound is read out, because the control unit 501 can detect a type of the instrument set at that time point, the control unit 501 finishes reading out the command information from the command information memory 508 is finished.

Thereafter, the control unit 501 controls the sound reproducing unit 506 to reproduce the scale recorded in this command panel 121*i* with timbre of the set instrument through the speaker 507.

In this manner, through combination of a plurality of command panels 121 including the command panel 121*h* for setting an instrument of reproduction sound and the command panel 121*i* for outputting reproduction sound of a predetermined scale, timbre and a scale to be output from the speaker 507 of the mobile robot 110 are determined. That is, the control unit 501 generates a scale to be reproduced by the command panel 121*i* for a scale read later with timbre of the instrument set by the command panel 121*h* read previously. Therefore, the learner can cause the mobile robot 110 to reproduce sound which the learner imagines by selecting the command panel 121*h* and the command panel 121*i* in combination.

Further, other than 'do' which is a reproduction scale of the command panel 121*i* illustrated in FIG. 5I, command panels 121*i* of respective scales of 're', 'mi', 'fa', 'so', 'la', 'si' and one octave higher 'do' are prepared. Note that, it is, of course, possible to provide command panels 121*i* for setting scales other than these.

In this manner, the mobile robot 110 according to this embodiment can execute operation of reproducing one piece of sound based on combination of the command information included in the two command panels of the command panel 121*h* and the command panel 121*i*. Further, by arranging a plurality of command panels 121*i* for outputting reproduction sound of predetermined scales after the command panel 121*h* for setting an instrument of reproduction sound, it is also possible to cause the mobile robot 110 to reproduce desired melody with desired timbre.

Still further, it is also possible to change speed of desired melody to be reproduced by changing movement speed of the mobile robot 110 when the mobile robot 110 passes through these pluralities of command panels 121*i*. Meanwhile, instead of the mobile robot 110 reproducing sound while moving, the mobile robot 110 may sequentially store scales without reproducing the scales when the mobile robot 110 passes through the command panels 121*i* for outputting scales and may reproduce melody constituted with these scales when the mobile robot 110 reaches the command panel 121*b* arranged at the goal point.

Further, regarding arrangement order of the command information in the command information memory 508, in a case where the command information of scales is not successive, and, for example, command information for causing the light emitting portion 220 of the mobile robot 110 to emit light, command information for causing the mobile robot 110 to rotate one revolution, or the like, are put between the command information of scales, the control unit 501 may cause the mobile robot 110 to reproduce the scales only from the command information of scales while eliminating the command information other than the command information of scales. At this time, the control unit 501 automatically extracts only the command information of scales among a plurality of pieces of command information stored in the command information memory 508 to cause the mobile robot 110 to sequentially reproduce the scales.

Figure 5J:
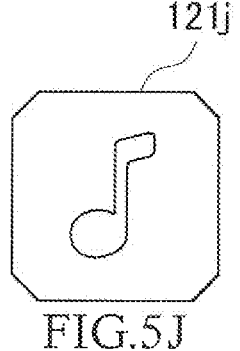

A command panel 121*j* includes command information for causing the mobile robot 110 to successively reproduce up to 20 pieces of sound of scales based on the command panels 121*i* for causing the mobile robot 110 to output reproduction sound of the scales read after movement is started (see FIG. 5J). Note that the number of scales to be reproduced is not limited to 20, and may be more than 20 or may be less than 20. Further, all the read scales may be reproduced. One picture of a note is drawn on this command panel 121*j*. When the mobile robot 110 reaches a central portion on this command panel 121*j*, the mobile robot 110 temporarily stops at that position and successively reproduces up to 20 pieces of sound once among the scales reproduced by reading the command information from the command panels 121*i* of scales by then.

When the mobile robot 110 reaches the central portion on this command panel 121*j*, the control unit 501 causes the optical reading module 240 to read the command information from the command panel 121*j*. The control unit 501 then causes the read command information to be newly added and stored in the command information memory 508.

Thereafter, the control unit 501 controls the motor controller 505 to temporarily stop movement of the mobile robot 110 on this command panel 121*j*.

Subsequently, the control unit 501 sequentially reads out the command information which has already been stored in the command information memory 508 in chronological order. At this time, the control unit 501 automatically extracts only command information for setting an instrument of reproduction sound recorded in the command panel 121*h* and the command information for outputting reproduction sound of a predetermined scale recorded in the command panel 121*i* and counts the number of pieces of command information of the command panels 121*i* of scales.

When the mobile robot 110 reaches this command panel 121*j* and the control unit 501 reads out the command information of the command panel 121*j* from the command information memory 508, the control unit 501 can detect that all the command information stored in the command information memory 508 is read out. By this means, the control unit 501 finishes reading out the command information from the command information memory 508 and finishes counting of the command information of the command panels 121*i* of scales.

Thereafter, the control unit 501 controls the sound reproducing unit 506 to sequentially reproduce scales with timbre of the set instrument from the speaker 507 so that the number of scales to be reproduced becomes up to 20.

At the end, the control unit 501 controls the motor controller 505 to cause the mobile robot 110 to move forward to the command panel 121 arranged next to this command panel 121*j*.

Figure 6A:
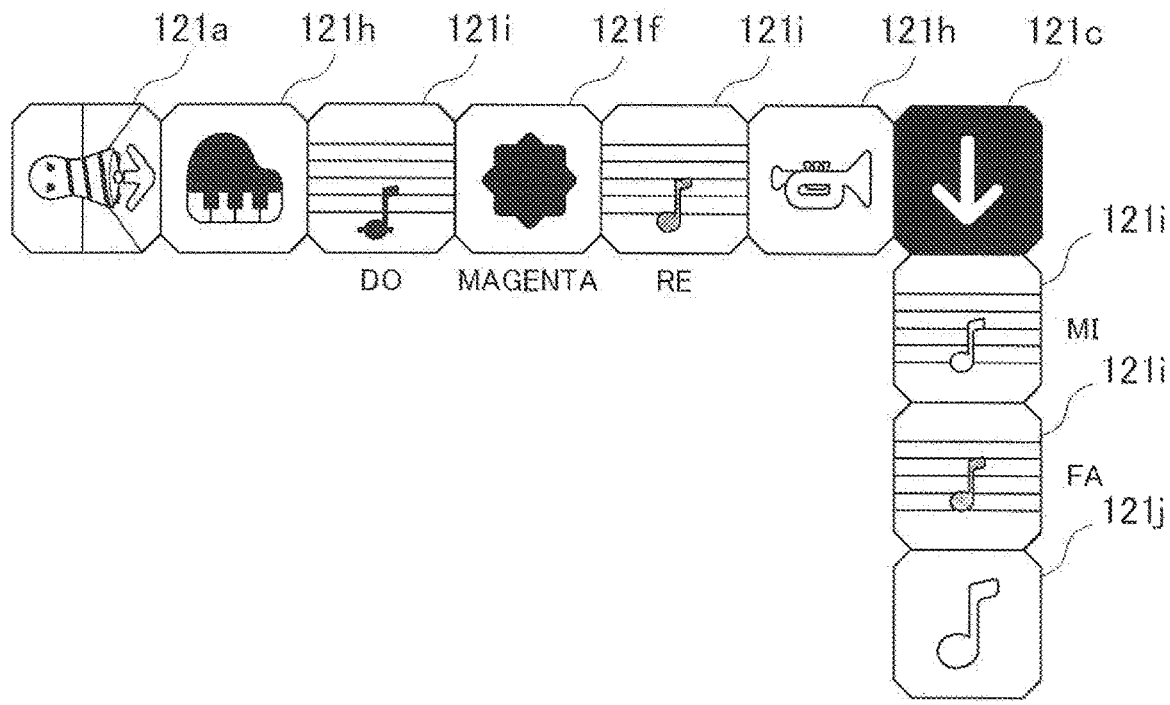
FIG. 6 is a plan view illustrating an example of a plurality of command panels arranged in a traveling direction of the mobile robot according to the embodiment. See FIGS. 6A and 6B.

FIG. 6A illustrates an example of the movement path 120 on which a plurality of command panels 121 are successively arranged from the command panel 121*a* arranged at the movement start position of the mobile robot 110 to the command panel 121*j*. Operation of the mobile robot 110 when the mobile robot 110 starts movement from the command panel 121*a* and reaches the command panel 121*j* will be described.

When the mobile robot 110 reaches the central portion on the command panel 121*j*, the control unit 501 causes the optical reading module 240 to read the command information from the command panel 121*j*. The control unit 501 then causes the read command information to be newly added and stored in the command information memory 508.

The control unit 501 then controls the motor controller 505 to stop movement of the mobile robot 110.

Subsequently, the control unit 501 sequentially reads out the command information which has already been stored in the command information memory 508 in chronological order.

At this time, the control unit 501 extracts the command information recorded in the command panel 121*h* and the command panel 121*i* and counts the number of pieces of command information of the command panels 121*i* of scales.

First, while the command information to be read out first is the command information recorded in the command panel 121*a*, because this command information is irrelevant to reproduction of scales, the control unit 501 does nothing and reads out the next command information from the command information memory 508.

Because the command information of the command panel 121*h* for setting a piano as reproduction sound of a scale is read out next, the control unit 501 sets a piano as the reproduction sound of the scale.

Because the command information to be read out next is command information recorded in the command panel 121*i* which causes a scale of 'do' to be reproduced, the control unit 501 increments the counted number by one. This command information is command information for causing a scale of 'do' to be reproduced with timbre of a piano.

Because the command information to be read out subsequently is command information recorded in the command panel 121*f* for causing the light emitting portion 220 to emit light in magenta, and is not relevant to reproduction of the scale, the control unit 501 does nothing and reads out the next command information.

Because the command information to be read out next is command information for causing a scale of 're' to be reproduced, the control unit 501 increments the counted number by one so that the number becomes a total of two. This command information is command information for causing a scale of 're' to be reproduced with timbre of a piano.

Because the command information of the command panel 121*h* for setting a trumpet as reproduction sound of a scale is read out next, the control unit 501 sets a trumpet as the reproduction sound of the scale.

Because the command information to be read out subsequently is command information recorded in the command panel 121*c* for determining the traveling direction of the mobile robot 110 and is irrelevant to reproduction of the scale, the control unit 501 does nothing and reads out the next command information.

Because the command information to be read out next and the next is command information for causing scales of 'mi' and 'fa' to be reproduced, the control unit 501 respectively increments the counted number by one so that the number becomes a total of four. This command information is command information for respectively causing scales of 'mi' and 'fa' to be reproduced with timbre of a trumpet.

At the end, the control unit 501 reads out the command information of the command panel 121j from the command information memory 508. The control unit 501 can detect that all the command information read from when the mobile robot 110 starts movement until when the mobile robot 110 reaches a current position is read out from the command information memory 508 from this command information. Therefore, the control unit 501 finishes reading out the command information from the command information memory 508 and finishes counting the number of pieces of command information of the command panels 121i of scales.

As a result, the number of pieces of the command information of the command panels 121i of scales becomes a total of four. This value is less than 20 which is a maximum piece of sound of scales to be reproduced by the command panel 121j. Therefore, the control unit 501 controls the sound reproducing unit 506 to reproduce scales of 'do' and 're' with timbre of a piano, and continuously reproduce scales of 'mi' and 'fa' with timbre of a trumpet from the speaker 507.

Thereafter, the control unit 501 controls the motor controller 505 to cause the mobile robot 110 to move forward.

Scale reproduction operation described above indicates one loop (repetition) processing of programming, and the learner can learn loop processing.

In this manner, this mobile robot 110 can successively reproduce a plurality of scales with timbres of the set instruments based on combination of respective pieces of command information of the command panel 121h, the command panel 121i and the command panel 121j.

Further, among all the command information stored in the command information memory 508, only the command information for setting an instrument of reproduction sound, recorded in the command panel 121h and the command information for outputting reproduction sound of a predetermined scale, recorded in the command panel 121i are automatically extracted, and a plurality of scales are sequentially reproduced with timbres of the set instruments. In a case where the command information of scales is not successive, and, for example, command information for causing the light emitting portion 220 of the mobile robot 110 to emit light, command information for determining the traveling direction of the mobile robot 110, or the like, are put between the command information of scales, the control unit 501 causes the mobile robot 110 to reproduce scales only from the command information of the scales while eliminating the command information other than the command information of scales.

Figure 5K:
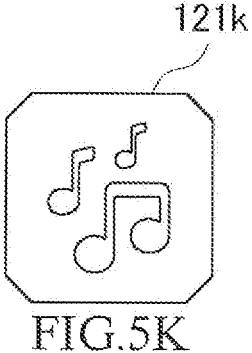
Figure 5M:
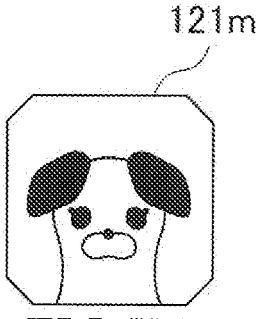

A command panel 121k includes command information for causing the mobile robot 110 to successively reproduce up to 20 pieces of sound of scales based on the command panels 121i for outputting reproduction sound of the scales read after movement is started and repeat this successive reproduction three times (see FIG. 5K). Three pictures of notes are drawn on this command panel 121k. When the mobile robot 110 reaches a central portion on this command panel 121k, the mobile robot 110 temporarily stops at the position, and successively reproduces up to 20 pieces of sound three times among the scales reproduced by reading the command information from the command panels 121i of scales by then.

While operation of the mobile robot 110 to be performed based on the command information recorded in the command panel 121k is basically the same as operation of the mobile robot 110 based on the command information of the command panel 121j described above, the operation based on the command information recorded in the command panel 121k is different from the operation based on the command information of the command panel 121j in that the scales are repeatedly reproduced three times.

Figure 6B:
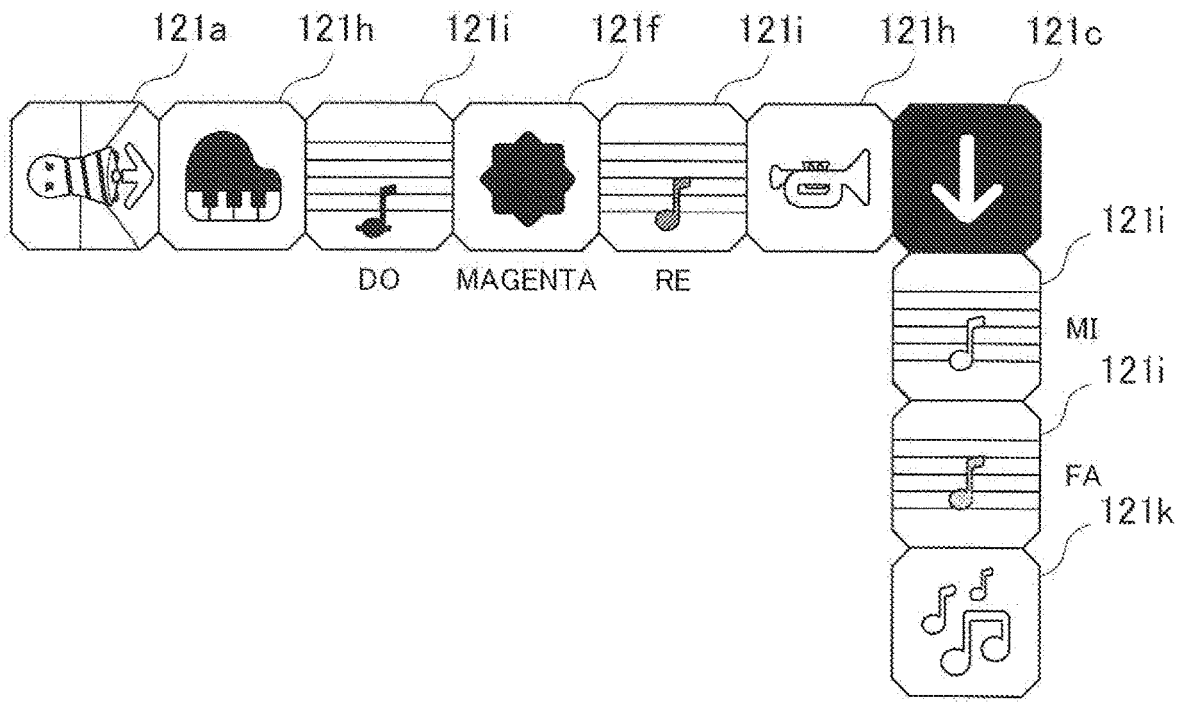

FIG. 6B illustrates arrangement in which the command panel 121j is replaced with the command panel 121k in the arrangement of the command panels 121 in FIG. 6A described above.

When the mobile robot 110 moves from the command panel 121a arranged at the movement start position illustrated in FIG. 6B to the command panel 121k, as the scales to be reproduced on the command panel 121k, 'do' and 're' are reproduced with a timbre of a piano, subsequently 'mi' and 'fa' are reproduced with a timbre of a trumpet, and reproduction of scales of 'do', 're', 'mi' and 'fa' is repeated three times.

The scale reproduction operation described above indicates three loop (repetition) processing of programming, and the learner can learn loop processing.

A command panel 121m includes command information for causing the mobile robot 110 to reproduce cry of a predetermined animal. A picture of a dog is drawn on this command panel 121m, and, when the mobile robot 110 passes through a central portion on this command panel 121m, cry of a dog is reproduced (see FIG. 5M). Further, command panels 121m on which pictures of a lion, a chicken and a cat are drawn are also prepared, and include command information for causing the mobile robot 110 to reproduce cry of respectively set animals. Note that, it is, of course, possible to provide command panels 121m for causing the mobile robot 110 to reproduce cry of other animals.

In this manner, according to this embodiment, by arranging various command panels 121 between the command panel 121a for start and the command panel 121b for goal, it is possible to cause the learner to learn the basics of computer programming while using operation of the mobile robot 110 to resemble computer processing. Further, for example, by using the command panel 121g for determining the traveling direction (corresponding to an IF sentence in computer language), or the like, the learner can learn a basic programming method such as "branch" and "loop". Still further, by concept of "error stop" being introduced, the learner can learn "debug".

Note that, concerning part or all of the command panels 121, it is also possible to allow the learner, or the like, to draw a picture himself/herself without using the command panel 121 on which a picture is printed in advance.

In the command panel 121 illustrated in FIG. 5, command information which becomes a basic command for the mobile robot 110 is recorded. Meanwhile, in the command panel 121 illustrated in FIG. 7, command information which enables the mobile robot 110 to perform more complicated operation is recorded.

Figure 7A:
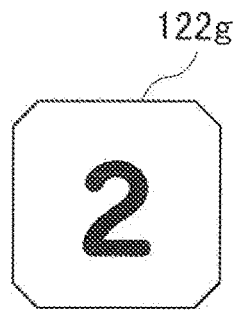
FIG. 7 is a plan view illustrating a plurality of examples of the command panel according to the embodiment. See FIGS. 7A, 7B, 7C, 7D, 7E, 7F, 7G, 7H, 7I, 7J, 7K, 7M, 7N, 7O.

A command panel 122g illustrated in FIG. 7A includes command information for causing the mobile robot 110 to store a number. This command panel 122g is an example of the command panel 122g including command information for causing the mobile robot 110 to store a number of '2'. The number of '2' is printed on this command panel 122g, and, when the mobile robot 110 passes through a central portion on this command panel 122g, the control unit 501 causes the number of '2' to be stored in the command information memory 508. Further, command panels 122g of numbers '0', '1', '3', '4', '5', '6', '7', '8' and '9' are also prepared. Note that, it is, of course, possible to provide command panels 122g of other numbers. The learner can further learn numbers by learning with this learning toy 100.

Figure 7B:
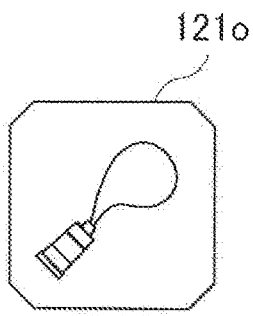
Figure 7C:
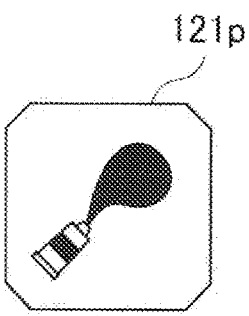
Figure 7D:
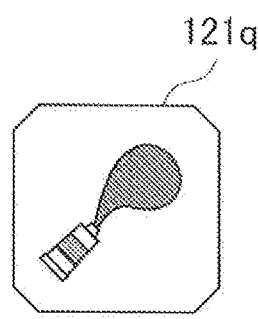

Command panels 121o, 121p and 121q include command information for causing the light emitting portion 220 of the mobile robot 110 to emit light based on relationship of three primary colors (see FIGS. 7B, 7C and 7D). The command panel 1210 of a picture in yellow among the three primary colors has command information indicating yellow among the relationship of the three primary colors, the command panel 121p of a picture in magenta among the three primary colors has command information indicating magenta among the relationship of the three primary colors, and the command panel 121q of a picture in cyan among the three primary colors has command information indicating cyan among the relationship of the three primary colors.

As well known, the relationship of the three primary colors is such that if yellow and magenta are mixed, red is obtained, if cyan and yellow are mixed, green is obtained, and if magenta and cyan are mixed, blue is obtained.

When the mobile robot 110 reaches one of the command panels 121o, 121p and 121q of the three primary colors first, the light emitting portion 220 emits light in a color of the picture at the central portion. Then, in a case where the mobile robot 110 reaches the second command panel among the command panels 121o, 121p and 121q of the three primary colors, the light emitting portion 220 emits light in a color obtained by mixing the color of the first picture and the color of the second picture based on the relationship of the three primary colors.

Figure 8A:
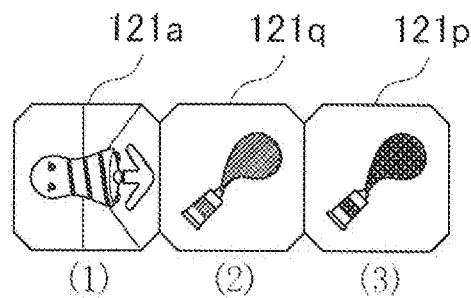
FIG. 8 is a plan view illustrating an example of a plurality of command panels arranged in the traveling direction of the mobile robot according to the embodiment, and is a view explaining a case where command information regarding three primary colors is included. See FIGS. 8A, 8B and 8C.

FIG. 8A illustrates arrangement of three command panels of the command panel 121a arranged at the start position at a leftmost position, the command panel 121q of cyan among the three primary colors, and the command panel 121p of magenta.

When the mobile robot 110 reaches the second command panel 121q of cyan, the light emitting portion 220 emits light in cyan. When the mobile robot 110 reaches the third command panel 121p of magenta next, the light emitting portion 220 emits light in blue which is a mixed color (added color) of cyan and magenta based on the relationship of the three primary colors.

The learner can learn the relationship of the three primary colors from arrangement of the command panels 121o, 121p and 121q and a color of light emitted from the light emitting portion 220 of the mobile robot 110 which passes through these.

Figure 8B:
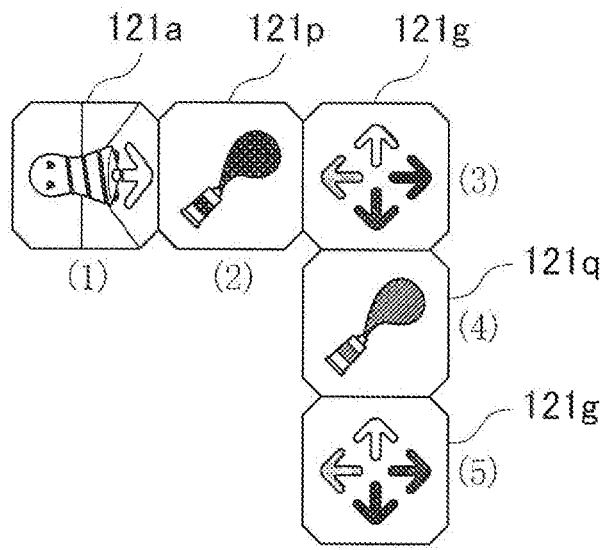

Concerning arrangement of five command panels 121 illustrated in FIG. 8B, when the mobile robot 110 which starts from the leftmost command panel 121a reaches the second command panel 121p of magenta, because this command panel 121p is the first command panel indicating a color among the three primary colors, the light emitting portion 220 emits light in magenta. When the mobile robot 110 reaches the third command panel 121g of four-direction arrows next, the mobile robot 110 travels in a direction of the arrow in magenta (downward) which is a color of light emitted from the light emitting portion 220. Then, when the mobile robot 110 reaches the fourth command panel 121q of cyan, the light emitting portion 220 emits light in blue which is a mixed color of magenta which is the second command panel, and cyan which is the fourth command panel. When the mobile robot 110 reaches the fifth command panel 121g of four-direction arrows, because the color of light emitted by the light emitting portion 220 is blue, the mobile robot 110 travels in a direction of the arrow in blue (rightward).

Note that when the mobile robot 110 passes through two command panels of the command panel 1210 of yellow and the command panel 121p of magenta, the light emitting portion 220 emits light in red which is a mixed color of yellow and magenta. When the mobile robot 110 reaches the command panel 121g of four-direction arrows in a state where the light emitting portion 220 emits light in red, because red does not match any color of four arrows, the mobile robot 110 goes straight regardless of the arrow.

Figure 8C:
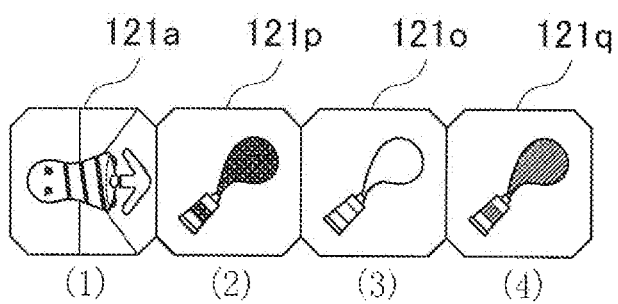

FIG. 8C illustrates arrangement of four command panels of the command panel 121a arranged at the start position at a leftmost position, the command panel 121p of magenta adjacent to the command panel 121a, the command panel 1210 of yellow next to the command panel 121p, and the fourth command panel 121q of cyan.

When the mobile robot 110 reaches the second command panel 121p of magenta, the light emitting portion 220 emits light in magenta, and, when the mobile robot 110 reaches the third command panel 1210 of yellow, the light emitting portion 220 emits light in red which is a mixed color of magenta of the second command panel and yellow of the third command panel. Further, when the mobile robot 110 reaches the fourth command panel 121q of cyan, the light emitting portion 220 emits light in green which is a mixed color of yellow of the third command panel and cyan of the fourth command panel.

In this manner, in a case where three command panels of different colors are arranged among the command panels 121o, 121p and 121q of the three primary colors, a color of light emitted by the light emitting portion 220 becomes a mixed color of a color of the first picture and a color of the second picture when the mobile robot 110 is located on the second command panel, and becomes a mixed color of a color of the second picture and a color of the third picture when the mobile robot 110 is located on the third command panel.

Note that it is also possible to cause the light emitting portion 220 to emit light in a mixed color of the mixed color of a color of the first picture and a color of the second picture, and a color of the third picture on the third command panel. In such a case, the light emitting portion 220 emits light in a color obtained by mixing red which is a mixed color of magenta of the first picture and yellow of the second picture, and cyan which is a color of the third picture on the third command panel 121q of cyan illustrated in FIG. 8C.

Because the mobile robot 110 changes light emission of the light emitting portion 220 based on a plurality of command panels 121, based on the relationship of the three primary colors, the learner can perform high-level programming. Further, the learner can learn the relationship of the three primary colors through relationship between the command panels 121 and light emission of the light emitting portion 220 of the mobile robot 110. Still further, the learner can learn operation of addition through mixture of colors.

Figure 7E:
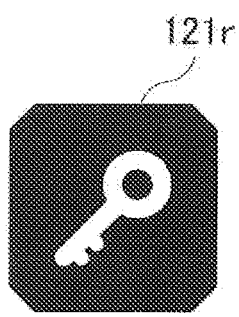

A picture of a key is printed on a command panel 121r illustrated in FIG. 7E, and, the command panel 121r includes command information for causing information indicating that the mobile robot 110 has passed through this command panel 121r to be stored in the command information memory 508. When the mobile robot 110 passes through a central portion on this command panel 121r, the control unit 501 causes command information indicating that the mobile robot 110 has passed through this command panel 121r to be newly added and stored in the command information memory 508. At this time, the control unit 501 causes acquisition sound indicating that a key is acquired, to be reproduced from the speaker 507 of the mobile robot 110. This acquisition sound is reproduced the number of times corresponding to the number of times the mobile robot 110 has passed through this command panel 121r until then. Further, the control unit 501 may cause the light emitting portion 220 to perform operation of emitting light in a predetermined color, or may cause the light emitting portion 220 to blink the number of times corresponding to the number of times the mobile robot 110 has passed through this command panel 121r until then.

Figure 7F:
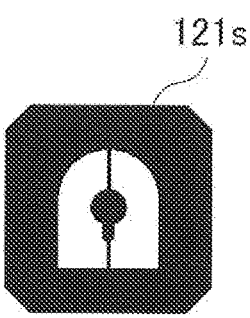

Further, a picture of a door having one keyhole is printed on a command panel 121s, and the command panel 121s includes command information for causing check as to whether the mobile robot 110 has passed through the command panel 121r on which a picture of a key is drawn one or more times beforehand to be performed when the mobile robot 110 reaches this command panel 121s (see FIG. 7F). A rule is set such that the mobile robot 110 has to pass through the command panel 121r on which a picture of a key is printed, one or more times before the mobile robot 110 reaches this command panel 121s on which a picture of a door with one keyhole is printed. In a case where the mobile robot 110 has passed through the command panel 121r one or more times, the mobile robot 110 can goes straight on this command panel 121s on which a picture of a door with one keyhole is printed. Further, when the mobile robot 110 passes through this command panel 121s, door open sound is caused to be generated from the mobile robot 110. In a case where the mobile robot 110 has not passed through the command panel 121r on which a picture of a key is printed, when the mobile robot 110 reaches a central portion of this command panel 121s on which a picture of a door with one keyhole is printed, the mobile robot 110 may be caused to stop at that position and may be made impossible to move forward or the mobile robot 110 may be caused to perform error operation. To perform this check, the control unit 501 sequentially reads out the command information stored in the command information memory 508 in reverse chronological order, and reads out all the command information. Then, it is only necessary to judge that there exist one or more pieces of command information which indicates that the mobile robot 110 has passed through the command panel 121r on which a picture of a key is printed among the read out command information. In a case where an error occurs as a result of conditions that the mobile robot 110 has passed through the command panel 121r on which a picture of a key is printed one or more times being not satisfied, the learner needs to correct arrangement of the command panels 121 to solve causes of occurrence of the error, so that the learner can learn debug work. Further, when an error occurs, the learner cannot visually confirm whether the mobile robot 110 has passed through the command panel 121r on which a picture of a key is printed from light emission, or the like, by the light emitting portion 220 of the mobile robot 110, and needs to correct arrangement of the command panels 121 while thinking back on the path through which the mobile robot 110 has passed, high-level debug work is required. When the learner thinks about a path of the mobile robot 110, the learner needs to perform programming design under a fixed rule, so that the learner can perform high-level programming.

Further, the learner can learn processing of condition determination which is determination as to whether the mobile robot 110 has passed through the command panel 121r of a key one or more times before the mobile robot 110 reaches the command panel 121s of a door with one keyhole.

The mobile robot 110 performs operation based on a plurality of pieces of command information recorded in the command panel 121r on which a picture of a key is printed and the command panel 121s on which a picture of a door with one keyhole is printed. That is, the control unit 501 makes a judgment as to whether one or more command panels 121r on which a picture of a key is printed are included among all the command panels 121 read previously, when the mobile robot 110 reaches the central portion of the command panel 121s on which a picture of a door with one keyhole is printed which is read later. When the mobile robot 110 reaches the command panel 121s, the control unit 501 automatically extracts the command information stored in the command information memory 508, and detects whether the mobile robot 110 has passed through the command panel 121r on which a picture of a key is printed one or more times. The control unit 501 then makes a judgment as to whether it is determined as an error based on a detection result.

Figure 7G:
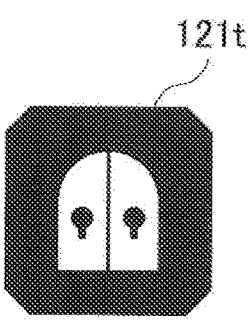

A picture of a door with two keyholes is printed on a command panel 121t, and the command panel 121t includes command information for causing a check to be performed as to whether the mobile robot 110 has passed through the command panel 121r on which a picture of a key is printed two or more times when the mobile robot 110 reaches this command panel 121t (see FIG. 7G). A rule is set such that the mobile robot 110 has to pass through the command panel 121r on which a picture of a key is printed two or more times before the mobile robot 110 reaches the command panel 121t on which a picture of a door with two keyholes is printed. In a case where the mobile robot 110 has passed through the command panel 121r on which a picture of a key is printed only one or less time, when the mobile robot 110 reaches a central portion on this command panel 121t on which a picture of a door with two keyholes is printed, the mobile robot 110 may be caused to stop at that position and may be made impossible to move further forward, or the mobile robot 110 may be caused to perform error operation. To perform this check, the control unit 501 sequentially reads out the command information stored in the command information memory 508 in reverse chronological order, and reads out all the command information. Then, it is only necessary to judge that there exists command information indicating that the mobile robot 110 has passed through two or more command panels 121r on which a picture of a key is printed among the read out command information.

In a case where the conditions are not satisfied, and an error occurs, the learner needs to correct arrangement of the command panels 121 so as to solve a cause of occurrence of the error, so that the learner can learn debug work. For example, the learner designs a path while devising arrangement of the command panels 121 so that the mobile robot 110 has passed through one command panel 121r of a key two or more times. In this manner, the learner can learn a loop (repetition) by designing the arrangement of the command panels 121.

Note that, if the mobile robot 110 has passed the command panel 121r of a key two or more times, the mobile robot 110 can move forward and pass through both the command panel 121s of a door with one keyhole and the command panel 121t of a door with two keyholes.

Figure 7H:
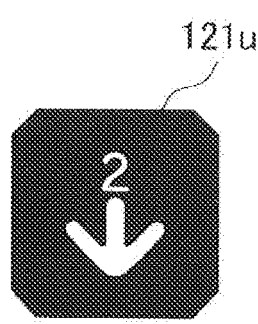

A command panel 121u includes command information for causing the mobile robot 110 to move in a direction of an arrow when the mobile robot 110 passes through this command panel 121u on ordinal numbers of a multiple of two, that is, on ordinal numbers of even numbers (see FIG. 7H). A picture printed on the command panel 121u is constituted with combination of a number of '2' and an arrow. The learner can recognize that the mobile robot 110 moves in a direction of the printed arrow when the mobile robot 110 passes through this command panel 121u on ordinal numbers of a multiple of two, that is, on ordinal numbers of even numbers, from the picture.

When the mobile robot 110 passes through a central portion on this command panel 121u the first time, the control unit 501 of the mobile robot 110 causes the optical reading module 240 to read command information from the command panel 121u. The control unit 501 then causes the read command information recorded in the command panel 121u to be stored in the command information memory 508. Subsequently, the control unit 501 sequentially reads out all the command information stored in the command information memory 508 in reverse chronological order and detects how many pieces of command information recorded in the command panel 121u are included. However, only one piece of command information of the command panel 121u stored in the command information memory 508 is detected when the mobile robot 110 passes through this command panel 121u the first time. Therefore, conditions for the mobile robot 110 moving in a direction of the arrow printed on this command panel 121u are not satisfied. As a result, the control unit 501 causes the mobile robot 110 to continue movement regardless of the printed arrow when the mobile robot 110 passes through the command panel 121u the first time. Thereafter, when the mobile robot 110 passes through the central portion on this command panel 121u the second time, the control unit 501 causes the optical reading module 240 to read the command information from the command panel 121u. The control unit 501 causes the read command information to be stored in the command information memory 508. The control unit 501 then sequentially reads out all the command information stored in the command information memory 508, and detects that two pieces (even number) of command information of this command panel 121u are included. As a result, because conditions for the mobile robot 110 moving in a direction of the arrow printed on this command panel 121u are satisfied, the control unit 501 controls the motor controller 505 to rotate the mobile robot 110 to face in the direction of the printed arrow, and then, causes the mobile robot 110 to move forward in the direction of the arrow.

Note that, as a result of the control unit 501 reading out all the command information in the command information memory 508 and performing check, in a case where an odd number such as three and five of command information of the command panel 121u are included, conditions for the mobile robot 110 moving in the direction of the arrow printed on the command panel 121u are not satisfied. Also in this case, the control unit 501 causes the mobile robot 110 to continue movement regardless of the arrow printed on the command panel 121u. Further, in a case where an even number such as four and six of command information of the command panel 121u are included, conditions for the mobile robot 110 moving in the direction of the arrow are satisfied, and the control unit 501 causes the mobile robot 110 to move in the direction of the arrow printed on the command panel 121u.

Figure 9A:
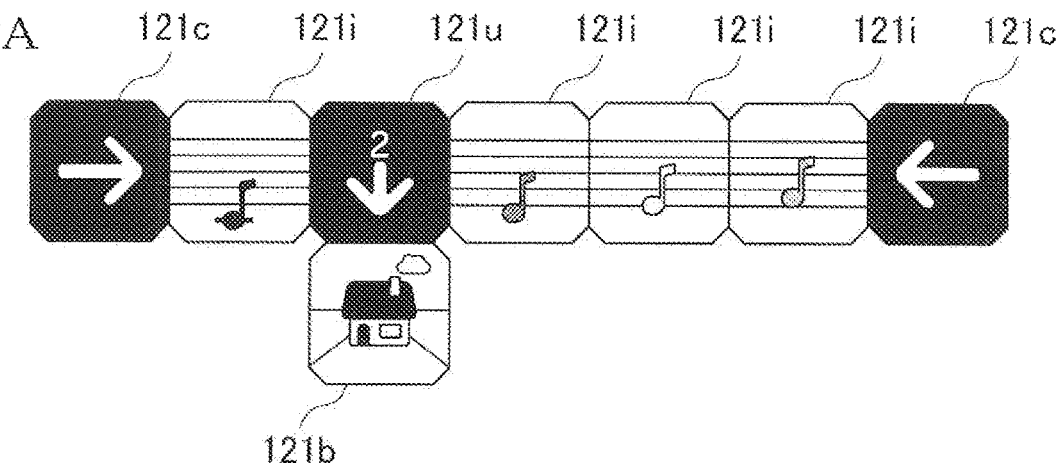
FIG. 9 is a plan view illustrating an example of a plurality of command panels arranged in the traveling direction of the mobile robot according to the embodiment. See FIGS. 9A, 9B and 9C.

As illustrated in FIG. 9A, operation of the mobile robot 110 in a case where a plurality of command panels 121 including this command panel 121u are arranged will be described.

In the arrangement illustrated in FIG. 9A, the command panel 121u for causing the mobile robot 110 to move in the direction of the arrow when the mobile robot 110 passes through the command panel 121u the second time is arranged on right adjacent to the command panel 121i for causing the mobile robot 110 to output reproduction sound of 'do' of a scale. Further, three command panels 121i for causing the mobile robot 110 to output reproduction sound of a scale are arranged on the right side in order of 're', 'mi' and 'fa' from left to right. Still further, on both ends of it, the command panels 121c of the arrow for determining the traveling direction of the mobile robot 110 are arranged. Note that these two command panels 121c on both ends are arranged so that the printed arrows face each other. Further, the command panel 121b in which the command information for stopping movement of the mobile robot 110 is recorded is arranged in the direction of the arrow printed on the command panel 121u in FIG. 9A.

If the mobile robot 110 moves from left to right on the command panels 121u, the command panel 121c, the command panels 121i and the command panel 121b arranged in this manner, first, the mobile robot 110 goes into the command panel 121c of the arrow arranged at a leftmost position. Because the arrow printed on this command panel 121c arranged at a leftmost position faces the right direction, the mobile robot 110 which goes into the command panel 121c from left to right, moves straight forward. After the mobile robot 110 passes through this command panel 121c, the mobile robot 110 passes through the central portion on the command panel 121i for causing reproduction sound of a scale to be output, and a scale of 'do' is reproduced. While the mobile robot 110 passes through the command panel 121u thereafter, because this is the first time that the mobile robot 110 passes through the command panel 121u, the mobile robot 110 does not move in a direction of the printed arrow, and continuously moves in the right direction. Subsequently, the mobile robot 110 passes through the central portion on the command panel 121i for causing reproduction sound of a scale to be output, and scales are reproduced in order of 're', 'mi' and 'fa'. Thereafter, the mobile robot 110 goes into the command panel 121c arranged at a rightmost position. Because the arrow printed on this command panel 121c arranged at the rightmost position faces the left direction, the mobile robot 110 which has gone into the command panel 121c from left to right makes a half turn on this command panel 121c and moves from right to left in an opposite direction. Thereafter, because the mobile robot 110 moves from right to left on the command panel 121i for causing reproduction sound of a scale to be output, scales are reproduced in order of 'fa', 'mi' and 're'. While the mobile robot 110 passes through the command panel 121u, this is the second time (ordinal number of an even number) the mobile robot 110 passes through the command panel 121u, the mobile robot 110 moves in the direction of the printed arrow, and reaches the command panel 121b arranged at a goal point, where movement of the mobile robot 110 is stopped.

Through operation of the mobile robot 110 on this command panel 121u, the learner can learn processing of programming of determining how many times operation is repeated and executing processing when conditions are satisfied. In a case of this command panel 121u, when the mobile robot 110 passes through the command panel 121u on ordinal numbers of a multiple of two, that is, ordinal numbers of even numbers, the mobile robot 110 moves in the direction of the printed arrow.

Figure 7I:
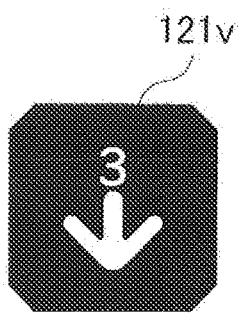

A command panel 121v illustrated in FIG. 7I includes command information for causing the mobile robot 110 to move in a direction of an arrow when the mobile robot 110 passes through this command panel 121v on ordinal numbers of a multiple of three.

Operation of the mobile robot 110 based on the command information recorded in this command panel 121v is substantially the same as the above-described operation of the mobile robot 110 based on the command panel 121u. However, the operation of the mobile robot 110 based on the command panel 121v is different from the operation of the mobile robot 110 based on the command panel 121u in that conditions for the mobile robot 110 moving in the direction of the arrow printed on this command panel 121v are satisfied when the mobile robot 110 passes through this command panel 121v on ordinal numbers of a multiple of three.

Figure 7J:
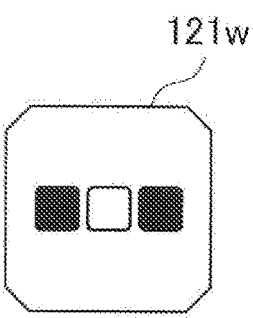

A command panel 121w includes command information for causing the mobile robot 110 to travel in a direction of an arrow and causing the mobile robot 110 to perform operation of ignoring and skipping one command panel 121 immediately after the mobile robot 110 passes through this command panel 121w (see FIG. 7J). In a case where there is no command panel 121 at a position after skipping, the mobile robot 110 is caused to perform error operation.

When the mobile robot 110 reaches a central portion on this command panel 121w, the control unit 501 causes the optical reading module 240 to read the command information from the command panel 121w. The control unit 501 then causes the read command information to be newly added and stored in the command information memory 508. Subsequently, the control unit 501 controls the motor controller 505 to cause the mobile robot 110 to move in a direction of an arrow printed on the command panel 121w. The control unit 501 causes the mobile robot 110 to move while climbing over one command panel 121 arranged next to this command panel 121w. At this time, the control unit 501 neither causes the mobile robot 110 to perform operation based on one command panel 121 arranged next to the command panel 121w, nor causes the command information to be stored in the command information memory 508. That is, the control unit 501 causes the mobile robot 110 to perform operation of skipping one command panel 121 arranged next to the command panel 121w.

Through operation of the mobile robot 110 on this command panel 121w, the learner can learn skipping processing.

Figure 9B:
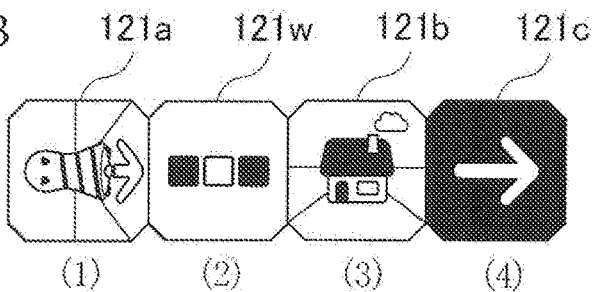

Concerning arrangement of four command panels 121 illustrated in FIG. 9B, after the mobile robot 110 which starts from the leftmost command panel 121a passes through the second command panel 121w of three squares, the mobile robot 110 skips the third command panel 121b of a house and travels so as to reach the fourth command panel 121c which determines the traveling direction.

Figure 7K:
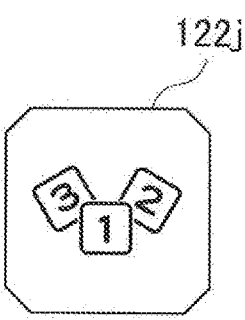

The command panel 122j illustrated in FIG. 7K includes command information for causing numerical values from 1 to 3 to be randomly generated, and causing the generated numerical values to be stored in the mobile robot 110. On this command panel 122j, a number 1 enclosed with a yellow small frame, a number 2 enclosed with a blue small frame, and a number 3 enclosed with a magenta small frame are drawn. To allow the learner to recognize the generated random number from 1 to 3, blinking by the light emitting portion 220 of the mobile robot 110 is changed or sound generated from the speaker 507 of the mobile robot 110 is changed.

For example, when the randomly generated numerical value is 1, the light emitting portion 220 is caused to emit light in yellow, when the randomly generated numerical value is 2, the light emitting portion 220 is caused to emit light in blue, and, when the randomly generated numerical value is 3, the light emitting portion 220 is caused to emit light in magenta.

In this case, because, when the mobile robot 110 passes through this command panel 122j, light in yellow, blue or magenta is emitted in accordance with a numerical value among 1 to 3 which is randomly generated, when the mobile robot 110 reaches the command panel 121g of a four-direction arrow illustrated in FIG. 5G thereafter, the mobile robot 110 travels while branching into a direction of an arrow whose color matches the color among the pictures of four arrows.

Further, sound from the speaker 507 may be caused to be reproduced only for a short period of time from when the mobile robot 110 reaches this command panel 122j until a numerical value is generated, so as to express that processing of randomly generating a numerical value is being performed.

Further, the light emitting portion 220 may be caused to blink in green the number of times corresponding to a value obtained by adding a numerical value among 1 to 3 generated at this command panel 122j to a value obtained by adding the numbers printed on the command panels 122g of numbers through which the mobile robot 110 has passed until then. Then, thereafter the light emitting portion 220 may be caused to emit light in yellow when the numerical value randomly generated on this command panel 122j is 1, emit light in blue when the numerical value is 2, and emit light in magenta when the numerical value is 3.

Figure 9C:
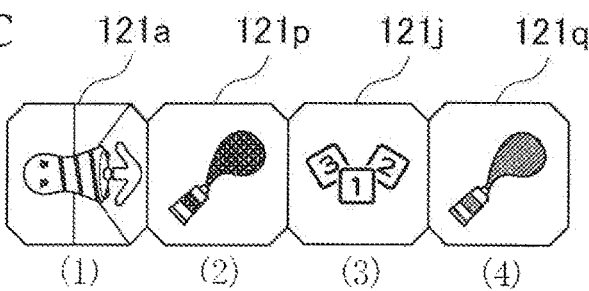

In the arrangement illustrated in FIG. 9C, command panels 122j of numbers 1 to 3 are arranged between the second magenta command panel 121p and the fourth cyan command panel 121q.

In this manner, in a case where the command panel 122j of numbers 1 to 3, a green command panel 121f, a red command panel 121f, or the like, which cause the light emitting portion 220 to emit light in a designated color are arranged between the command panels 121o, 121p and 121q of three primary colors, even if the command panels 121o, 121p and 121q of three primary colors are arranged second, the light emitting portion 220 may be caused to emit light in colors of pictures of the command panels 121o, 121p and 121q without being caused to emit light in a mixed color.

In the arrangement illustrated in FIG. 9C, when the mobile robot 110 reaches the second magenta command panel 121p, the light emitting portion 220 emits light in magenta, and, when the mobile robot 110 reaches the fourth cyan command panel 121q, the light emitting portion 220 emits light in cyan.

Figure 7M:
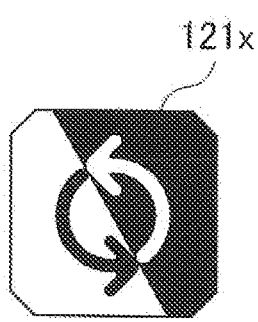
Figure 7N:
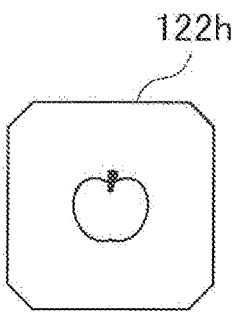

A command panel 121x illustrated in FIG. 7M includes command information for causing information to be reversely interpreted. For example, if the mobile robot 110 passes through this command panel 121x at least once, the mobile robot 110 may travel in a direction opposite to a direction of an arrow on the command panel 121c of the arrow through which the mobile robot 110 passes thereafter.

Through operation of the mobile robot 110 on this command panel 121x, the learner can learn NOT operation (reverse interpretation).

The command panel 122h includes command information for causing the mobile robot 110 to store a fact that one apple is obtained. On this command panel 122h, a picture of one apple is printed (see FIG. 7N). Note that a command panel 122h on which two or more apples are drawn is also prepared. When the mobile robot 110 reaches a central portion on this command panel 122h, the light emitting portion 220 may be caused to blink in red the number of times which is the same as the number of the printed apples. Because red of the light emitting portion 220 makes the learner imagine a color of an apple, the learner can recognize from this color of light emission that the number of times indicates the number of apples. Further, because the number of the printed apples is the same as the number of times of blinking of the light emitting portion 220, the learner can visually recognize the number and learn numbers.

Further, when the mobile robot 110 passes through a central portion on the command panel 122h of apples, the number of apples may be added up by the number of drawn apples. By this means, the number of apples through which the mobile robot 110 has passed until then is added up every time the mobile robot 110 passes through the command panels 122h of apples. At this time, the mobile robot 110 may cause the light emitting portion 220 to blink in red the number of times which is the same as the added number of apples on this command panel 122h. The learner can visually learn addition without using numbers by observing the number of times of blinking of the light emitting portion 220. By this means, even infants for whom it seems difficult to recognize numbers can learn addition.

Figure 7O:
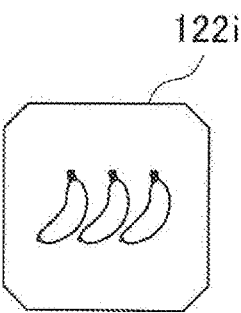

A command panel 122i includes command information for causing the mobile robot 110 to store a fact that three bananas are obtained (see FIG. 7O). Pictures of three bananas are printed on this command panel 122i. Note that a command panel 122i on which bananas of the number other than three are drawn is also prepared. In a similar manner to a case of the above-described command panel 122h of apples, the mobile robot 110 may cause the light emitting portion 220 to blink in yellow the number of times which is the same as the number of the printed bananas on this command panel 122i. Because yellow of the light emitting portion 220 makes the learner imagine a color of a banana, the learner can recognize from this color of light emission that the number of times indicates the number of bananas.

Further, also concerning this command panel 122i of bananas, the number of bananas may be added up by the mobile robot 110 passing through the command panels 122i. In a similar manner to a case of the above-described command panel 122h of apples, when the mobile robot 110 reaches the command panel 122i of bananas, the light emitting portion 220 may be caused to blink in yellow the number of times which is the same as the added number of bananas.

By using the command panel 122h and the command panel 122i, the learner can learn numbers through things around the learner such as apples and bananas instead of through numbers.

Figure 10A:
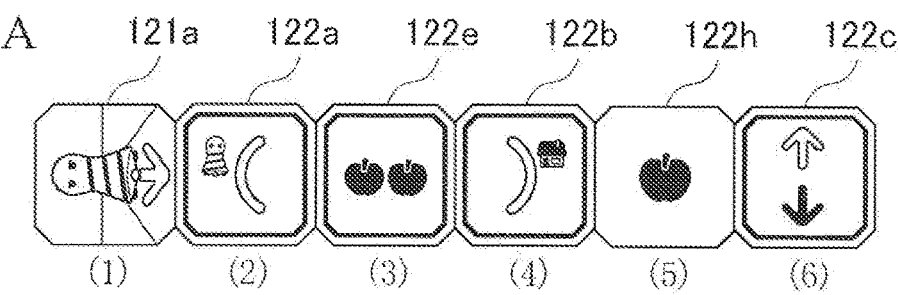
FIG. 10 is a plan view illustrating an example of a plurality of command panels arranged in the traveling direction of the mobile robot according to the embodiment, and is a view explaining a case where there is one piece of first comparison command information constituting first comparison target information. See FIGS. 10A and 10B.
Figure 10B:
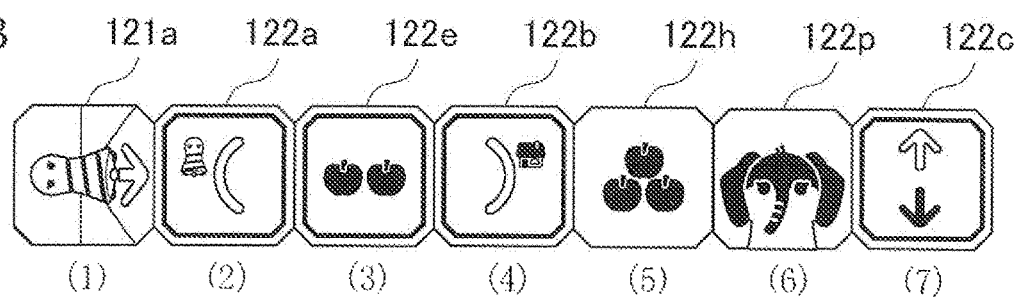

Further, it is also possible to define a rule that, when the mobile robot 110 passes through the command panel 122p on which a picture of an elephant is printed, assuming that the elephant eats one apple, the number of apples acquired by the mobile robot 110 so far is decreased by one (see FIG. 10B). At this time, the mobile robot 110 may cause the light emitting portion 220 to blink in red the same number of times as the number of apples after the number of apples acquired so far is decreased by one, on the command panel 122p of an elephant. The learner can visually learn subtraction without using numbers by observing the number of times of blinking of the light emitting portion 220. By this means, it is also possible to enable even an infant for whom it seems difficult to learn numbers, to learn subtraction.

Subtraction of the number of apples by one on this command panel 122p expresses image that one apple is given to an elephant, which is an ingenuity for allowing the learner to learn with interest.

Figure 12A:
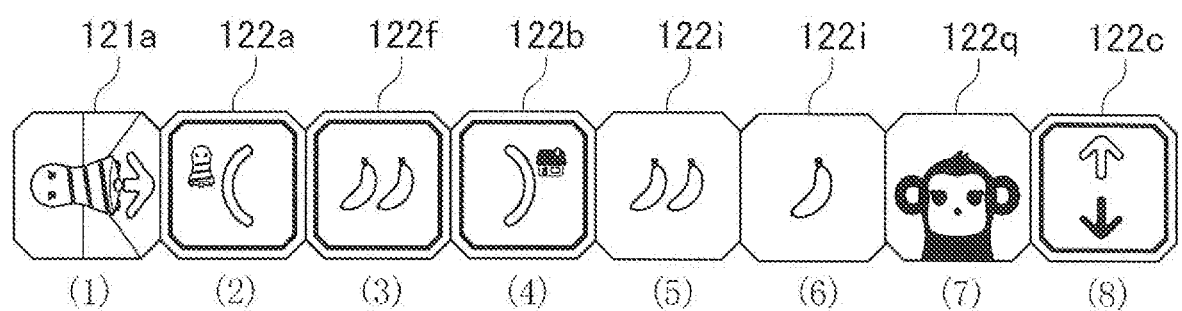
FIG. 12 is a plan view illustrating an example of a plurality of command panels arranged in the traveling direction of the mobile robot according to the embodiment, and is a view explaining a case where there is one piece of the first comparison command information constituting the first comparison target information. See FIGS. 12A and 12B.

Further, it is also possible to define a rule that, when the mobile robot 110 passes through the command panel 122q on which a picture of a monkey is printed, assuming that the monkey eats one banana, the number of bananas acquired by the mobile robot 110 so far is decreased by one (see FIG. 12A). Also at this time, as with the case of the above-described command panel 122h of apples, the mobile robot 110 may cause the light emitting portion 220 to blink in yellow the same number of times as the number of bananas after the number of bananas acquired so far is decreased by one, on the command panel 122i of a banana By this means, the learner can learn addition and subtraction without using numbers.

As described above, a picture which allows the learner to recognize the recorded command information is drawn on the command panel 121, so that the learner can recognize the command information from this picture.

FIG. 10A illustrates a plan view of six command panels 121 which are successively arranged.

Command information for causing the mobile robot 110 to start movement is recorded in the leftmost command panel 121a. The learner arranges this command panel 121a at a start position of the movement path 120, and, first, puts the mobile robot 110 on this command panel 121a to cause the mobile robot 110 to start.

Thereby, the mobile robot 110 starts movement in a direction of an arrow drawn on this command panel 121a.

As illustrated in FIG. 10A, then, a command panel 122a with a picture of a left parenthesis, a command panel 122e with a picture of two apples, and a command panel 122b with a picture of a right parenthesis are arranged from left to right.

Three pieces of command information respectively recorded in these three command panels 121 constitute first comparison target information.

On the command panel 122a of a left parenthesis, a picture expressing a light blue left parenthesis is drawn on a central portion, and a small picture expressing the mobile robot 110 is drawn on a left side of the left parenthesis, and a light blue frame is drawn so as to enclose these pictures. The picture of the mobile robot 110 drawn on the left side is made to correspond to the picture of the command panel 121a arranged at the start position of the movement path 120. The picture of the mobile robot 110 is associated with the picture at the start position so that the learner can imagine from this command panel 122a that the first comparison target information is started.

On the command panel 122b of a right parenthesis, a picture expressing a light blue right parenthesis is drawn on a central portion, and a small picture expressing a house is drawn on a right side of the right parenthesis, and a light blue frame is drawn so as to enclose these pictures. The picture of the house on the right side is made to correspond to the picture of the command panel 121b arranged at a goal position of the movement path 120 (see FIG. 9B, FIG. 13C and FIG. 15). The picture of the house on the right side is associated with the picture of the goal position so that the learner can imagine that the first comparison target information is finished at this position.

On the command panel 122e of apples, a picture expressing two apples is drawn on a central portion, and a light blue frame is drawn so as to enclose the picture.

In this manner, the command panel 121 with a picture enclosed with the light blue frame is arranged between the command panel 122a of a left parenthesis and the command panel 122b of a right parenthesis so as to constitute the first comparison target information. Only pictures enclosed with the light blue frame become effective as the first comparison target information in the parentheses.

This first comparison target information is constituted with start position command information which is command information indicating a start position of the first comparison target information, end position command information which is command information indicating an end position of the first comparison target information, and one piece of first comparison command information constituted with one piece of command information recorded in the command panel 121 put between two command panels 121 on which the start position command information and the end position command information are respectively recorded.

In the command panel 122a of a left parenthesis, the start position command information is recorded, and in the command panel 122b of a right parenthesis, the end position command information is recorded.

Further, command information recorded in the command panel 122e of two apples put between the command panel 122a of a left parenthesis and the command panel 122b of a right parenthesis corresponds to the first comparison command information.

In the arrangement illustrated in FIG. 10A, while one command panel 122e of apples is put between the command panels, a plurality of command panels may be put between the command panels.

Further, command panels 122e with a picture of one apple and with a picture of three or more apples are also prepared.

In this command panel 122e of apples, the number of the drawn apples is recorded as the command information. When the mobile robot 110 reads the number of apples from this command panel 122e of apples, the number of apples read from all the command panels 122e of apples put between the command panel 122a of a left parenthesis and the command panel 122b of a right parenthesis is added. Further, it is also possible to cause the light emitting portion 220 to blink in red the number of times corresponding to the added number of apples when the mobile robot 110 reaches a central portion on this command panel 122e of apples.

As illustrated in FIG. 10A, a command panel 122h on which a picture of one apple is drawn is arranged right adjacent to the command panel 122b of a right parenthesis. This command panel 122h of an apple is arranged outside the above-described command panel 122a of a left parenthesis and the command panel 122b of a right parenthesis.

The command information recorded in this command panel 122h constitutes second comparison target information.

The second comparison target information is constituted with only the command panels 121 after the command panel 122b of a right parenthesis. Therefore, the command panels arranged before the command panel 122a of a left parenthesis do not affect the second comparison target information.

While, in the arrangement illustrated in FIG. 10A, only one command panel 122h of apples is arranged after the command panel 122b of a right parenthesis, a plurality of command panels may be arranged. In this case, the second comparison target information is constituted with a plurality of command panels 122h of apples.

Further, a command panel 122h on which a picture of two or more apples is drawn is also prepared.

In this command panel 122h of apples, the number of the drawn apples is recorded as the command information. When the mobile robot 110 reads the number of apples from this command panel 122h of apples, the number of apples read from all the command panels 122h of apples arranged outside the command panel 122a of a left parenthesis and the command panel 122b of a right parenthesis is added. Further, it is also possible to cause the light emitting portion 220 to blink in red the number of times corresponding to the added number of apples when the mobile robot 110 reaches a central portion on this command panel 122h of apples.

When a picture drawn on this command panel 122h of apples is compared with a picture of the command panel 122e of apples constituting the above-described first comparison command information, the picture of the command panel 122h is different from the picture of the command panel 122e in that, while there is no light blue frame on this command panel 122h, a light blue frame is drawn on the command panel 122e constituting the first comparison command information.

Only the command panel 121 like a command panel 122e, on which a light blue frame is drawn, can constitute the first comparison target information. The command panel 121 with a light blue frame is arranged between the command panel 122a of a left parenthesis and the command panel 122b of a right parenthesis, so as to be used to constitute the first comparison target information.

The second comparison target information is compared with the first comparison command information among the first comparison target information, and it is determined whether content of the respective kinds of information matches each other.

In a case where content matches each other, the light emitting portion 220 emits light in light blue on the command panel 122c of a two-direction arrow which will be described later, and the mobile robot 110 travels in a direction of a light blue arrow drawn on the command panel 122c.

In an example in FIG. 10A, the command panel 122h indicating one apple is compared with the command panel 122e which indicates two apples and which constitutes the first comparison command information, and it is determined whether content matches each other.

It is also possible to cause the light emitting portion 220 to blink in light blue twice or light in light blue if the number of apples matches each other when the mobile robot 110 reaches the command panel 122h of apples. Further, it is also possible to cause notification sound which makes a notification that content matches each other to be generated from the speaker 507. Then, in a case where a state changes from a state where the number of apples matches each other to a state where the number of apples does not match each other, it is also possible to turn off light emission of the light emitting portion 220 which has lighted in light blue or cause notification sound which makes a notification that the state changes to a state where the number of apples does not match each other to be generated from the speaker 507.

As illustrated in FIG. 10A, the command panel 122c of a two-direction arrow is arranged right adjacent to the command panel 122h of an apple.

On this command panel 122c of a two-direction arrow, a picture of a light blue arrow and a gray arrow facing opposite directions, and a light blue frame enclosing the picture are drawn.

When the mobile robot 110 reaches this command panel 122c of a two-direction arrow, the first comparison command information and the second comparison target information are determined based on the command information of the command panels 121 read so far as the mobile robot 110 moves.

The command information recorded in this command panel 122c of a two-direction arrow is a command such that, in a case where it is determined that content of the respective pieces of command information matches each other as a result of the first comparison command information being compared with the second comparison target information, the mobile robot 110 is caused to move in a direction of a light blue arrow (upward direction), while, in a case where it is determined that the content does not match each other, the mobile robot 110 is caused to move in a direction of a gray arrow (downward direction).

In a case where the content matches each other, it is also possible to cause the light emitting portion 220 to emit light in light blue. Further, it is also possible to cause notification sound (correct sound) which makes a notification that the content matches each other to be generated from the speaker 507. Then, also in a case where the content does not match each other, it is also possible to cause notification sound (incorrect sound) which makes a notification that the content does not match each other to be generated. By this means, the learner can confirm a result of the determination of the comparison between the first comparison command information and the second comparison target information from light emission and sound from the mobile robot 110.

While, in this example, determination as to whether content of the first comparison command information matches content of the second comparison target information is performed through comparison, determination may be performed under other conditions.

Operation of the mobile robot 110 when the mobile robot 110 moves on six command panels 121 illustrated in FIG. 10A will be described in detail next.

First, the mobile robot 110 is put on the command panel 121a arranged at the leftmost start position by the learner, and starts movement.

Regardless of a direction the mobile robot 110 which is put on the command panel 121a faces, the control unit 501 controls the motor controller 505 to actuate the moving mechanism 230, and causes the mobile robot 110 to rotate in a direction of an arrow drawn on this command panel 121a by detecting a direction from the command information read by the optical reading module 240. The control unit 501 then actuates the moving mechanism 230 to cause the mobile robot 110 to move forward in the direction of this arrow and move to an adjacent command panel 122a of a left parenthesis.

The mobile robot 110 moves on the adjacent command panel 122a of a left parenthesis, a command panel 122e of two apples, a command panel 122b of a right parenthesis, and a command panel 122h of one apple. The control unit 501 causes the command information read at the respective command panels to be stored in the command information memory 508.

When the mobile robot 110 reaches a central portion of the fifth command panel 122h of one apple, the control unit 501 reads out the command information stored in the command information memory 508 in chronological order and confirms the content.

The oldest command information is command information of the command panel 121a arranged at the start position, the second oldest command information is command information of the command panel 122a of a left parenthesis, the third oldest command information is command information of the command panel 122e of two apples, and as the fourth command information, command information of the command panel 122b of a right parenthesis is read out. If the command information to the fourth command information is read out, the control unit 501 detects that the second to the fourth command information constitutes the first comparison target information. Further, the control unit 501 detects that the second command information is the start position command information, the fourth command information is the end position command information, and the third command information put between the second command information and the fourth command information is the first comparison command information. Still further, as the first comparison command information, information that the number of apples is two is read.

Subsequently, if the control unit 501 reads out the command information from the command information memory 508, it is detected that the fifth command information is the command panel 122h of one apple. This command panel 122h of an apple is a current position of the mobile robot 110. Here, the control unit 501 may determine whether the number of apples matches each other by comparing information indicating that the number of apples indicated by this command panel 122h of an apple is one with information indicating that the number of apples indicated by the first comparison command information is two. Because the number of apples does not match each other on the fifth command panel 122h of an apple, the control unit 501 actuates the moving mechanism 230 without changing light emission of the light emitting portion 220 or generating sound from the speaker 507, and causes the mobile robot 110 to move forward and move to an adjacent command panel 122c of a two-direction arrow.

In a case where a picture of this command panel 122h of an apple is a picture of two apples, the number of apples matches the number of apples indicated by the first comparison command information. In this case, the control unit 501 may cause the light emitting portion 220 to blink in light blue twice, and cause notification sound which makes a notification that the number of apples matches each other to be generated from the speaker 507.

If the mobile robot 110 reaches a central portion on the command panel 122c of a two-direction arrow, the control unit 501 causes the read command information to be stored in the command information memory 508.

Subsequently, the control unit 501 sequentially reads out the command information stored in the command information memory 508 in chronological order and confirms the command information. By this means, the control unit 501 detects that the second to the fourth command information constitutes the first comparison target information, the second command information is the start position command information, the third command information is the first comparison command information indicating two apples, and the fourth command information is the end position command information. Further, the control unit 501 detects that the command panel 122c of a two-direction arrow is arranged as the sixth command panel, and the previous fifth command panel includes the second comparison target information indicating one apple.

On this command panel 122c, the first comparison command information is compared with the second comparison target information, and, if conditions that content of the respective pieces of information matches each other are satisfied, the mobile robot 110 travels in a direction of a light blue arrow of the picture, and if the conditions are not satisfied, the mobile robot 110 travels in a direction of a gray arrow.

The control unit 501 compares the first comparison command information with the second comparison target information based on the command information of the command panel 122c of a two-direction arrow to determine whether the number of apples matches each other. As a result of this comparison determination, because the number of apples does not match each other, the control unit 501 actuates the moving mechanism 230 and causes the mobile robot 110 to rotate in a direction of a gray arrow (downward) drawn on this command panel 122c. The control unit 501 then actuates the moving mechanism 230 to cause the mobile robot 110 to move forward in a direction of this arrow. At this time, the control unit 501 may cause notification sound which makes a notification that the number of apples does not match each other to be generated from the speaker 507 at a central portion of this command panel 122c.

In a case where the second comparison target information indicates two apples, it is determined that the number of apples matches each other as a result. In this case, the control unit 501 actuates the moving mechanism 230 to rotate the mobile robot 110 in a direction of a light blue arrow (upward) drawn on this command panel 122c and causes the mobile robot 110 to move forward in a direction of this arrow. At this time, the control unit 501 may cause the light emitting portion 220 to emit light in light blue so as to indicate that the number of apples matches each other, or cause notification sound which makes a notification that the number of apples matches each other to be generated from the speaker 507.

Note that, while, in the example illustrated in FIG. 10A, the first comparison target information includes the start position command information and the end position command information, the first comparison target information does not have to include these kinds of information. For example, it is also possible to compare the command panel 122e indicating two apples with the command panel 122h indicating one apple, which are adjacent to each other, as arrangement obtained by removing the command panel 122a of a left parenthesis and a command panel 122b of a right parenthesis from the arrangement illustrated in FIG. 10A. By this means, it is possible to constitute the first comparison target information using one command panel 121.

Arrangement of seven command panels 121 illustrated in FIG. 10B will be described next.

When the arrangement illustrated in FIG. 10B is compared with the arrangement illustrated in FIG. 10A, the command panel 122h indicating one apple which is arranged as the fifth command panel from the leftmost position in FIG. 10A is replaced with a command panel 122h indicating three apples in FIG. 10B. Further, in the arrangement illustrated in FIG. 10B, a command panel 122p with a picture of an elephant is arranged left adjacent to the rightmost command panel 122c of a two-direction arrow, and the number of command panels 121 is increased by one.

In the command panel 122p of an elephant, command information for causing cry of an elephant to be reproduced from the speaker 507 when the mobile robot 110 reaches a central portion of this command panel 122p is recorded.

Further, when the mobile robot 110 reaches this command panel 122p, one is subtracted from a numerical value obtained by adding the number of apples read from all the command panels 122h of apples so far. It is also possible to cause the light emitting portion 220 to blink in red the number of times corresponding to the number of apples after one is subtracted.

Subtraction of one from the number of apples on this command panel 122p expresses image that one apple is given to an elephant. Such ingenuity is used so that the learner can learn with interest.

In the arrangement illustrated in FIG. 10B, the first comparison target information is constituted based on three command panels from the second to the fourth command panels from the leftmost command panel. The second command panel 122a of a left parenthesis corresponds to the start position command information, the third command panel 122e of two apples corresponds to the first comparison command information, and the fourth command panel 122b of a right parenthesis corresponds to the end position command information. Description so far is similar to that in FIG. 10A.

The command information recorded in the command panel 122h of three apples which is the fifth command panel from the leftmost command panel, and the command information recorded in the sixth command panel 122p of an elephant constitute the second comparison target information. The arrangement illustrated in FIG. 10B is different from the arrangement illustrated in FIG. 10A in that the second comparison target information is constituted with a plurality of pieces of command information in this manner.

When the mobile robot 110 starts from the command panel 121a arranged at the start position at the leftmost position and reaches the seventh command panel 122c of a two-direction arrow, the first comparison command information is compared with the second comparison target information to determine whether content matches each other. The first comparison command information includes content indicating two apples. Further, the second comparison target information includes content indicating two apples by the command panel 122h indicating three apples and the command panel 122p of an elephant which subtracts one from the number of apples. Therefore, it is determined that the content matches each other, and the mobile robot 110 moves in a direction of a light blue arrow (upward) drawn on this command panel 122c. Further, it is also possible to cause the light emitting portion 220 to emit light in light blue or cause notification sound to be generated from the speaker 507.

Arrangement of thirteen command panels 121 illustrated in FIG. 11A will be described next.

Command information of six command panels from the second command panel 122a of a left parenthesis from the leftmost position to the seventh command panel 122b of a right parenthesis constitutes the first comparison target information. Further, command information of the second command panel 122a of a left parenthesis and command information of the seventh command panel 122b of a right parenthesis respectively constitute the start position command information and the end position command information. Further, command information of four command panels from the third command panel 122e of two apples to the sixth command panel 122d with a picture of a number 3 constitutes four pieces of first comparison command information.

These kinds of first comparison command information are constituted with three types of command panels of a command panel 122e of apples, a command panel 122f with a picture of bananas and a command panel 122d with a picture of a number. The first comparison command information based on the command panel 122e of apples and the command panel 122f of bananas includes information of pictures of apples and bananas. Further, the first comparison command information based on the command panel 122d of a number includes information of a numerical value.

Figure 11A:
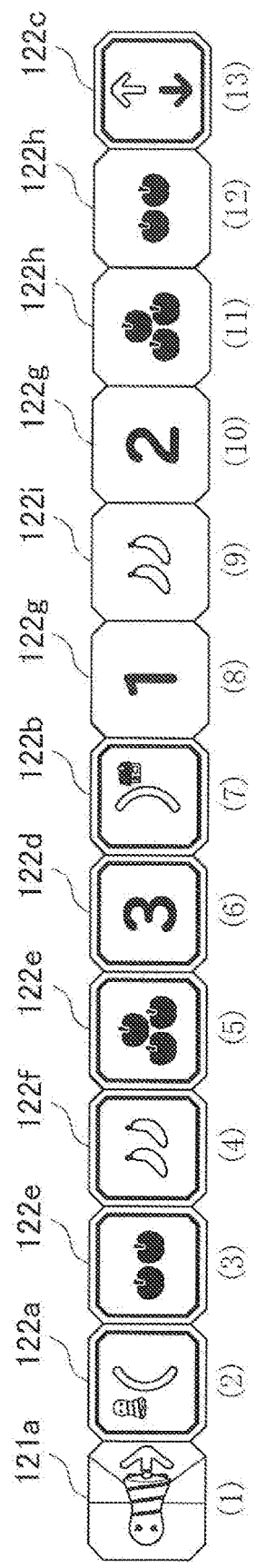
FIG. 11 is a plan view illustrating an example of a plurality of command panels arranged in the traveling direction of the mobile robot according to the embodiment, and is a view explaining a case where there are a plurality of types of the first comparison command information constituting the first comparison target information. See FIGS. 11A and 11B.

Command information of five command panels from the eighth command panel 122g with a picture of a number of 1 from the leftmost position to the twelfth command panel 122h of two apples illustrated in FIG. 11A constitutes the second comparison target information. Further, these five pieces of command information constituting the second comparison target information constitute five pieces of second comparison command information.

These pieces of second comparison command information are constituted with three types of command panels of a command panel 122h of apples, a command panel 122i of bananas, and a command panel 122g of a number. The second comparison command information based on the command panel 122h of apples and the command panel 122i of bananas includes information of pictures of apples and bananas. Further, the second comparison information based on the command panel 122g of a number includes information of a numerical value.

A command panel 122h of two apples and a command panel 122h of three apples are respectively arranged as the third and the fifth command panels from the leftmost position illustrated in FIG. 11A, a command panel 122f of two bananas is arranged as the fourth command panel, and a command panel 122d of a number of 3 is arranged as the sixth command panel. Further, these command panels constitute the first comparison command information.

On this command panel 122f of bananas, a picture expressing two bananas is drawn at a central portion, and a light blue frame is drawn so as to enclose the picture. Other than this command panel 122f, command panels 122f on which one banana is drawn, and three or more bananas are drawn, are also prepared.

Further, on this command panel 122d of a number, a picture expressing a number of 3 is drawn at a central portion, and a light blue frame is drawn so as to enclose the picture. Other than this command panel 122d, command panels 122d on which 2 or smaller number is drawn, and four or greater number is drawn, are also prepared.

Description regarding these command panel 122f of bananas and command panel 122d of a number is similar to the above description of the command panel 122e of apples. However, it is necessary to apply the description while apples are replaced with bananas or a number.

Further, the command panel 122i of two bananas is arranged as the ninth command panel from the leftmost position, and command panels 122g of a number of 1 and a number of 2 are respectively arranged as the eighth and the tenth command panels, and command panels 122h of three apples and two apples are arranged as the eleventh and the twelfth command panels. Further, these command panels constitute the second comparison command information.

On these command panel 122i of bananas and command panel 122g of a number, a light blue frame is not drawn. The command panel 122i and the command panel 122g are different from the command panel 122f and the command panel 122d in that a light blue frame is not drawn. Further, command panels 122i of bananas of the number other than this number, and command panels 122g of numbers other than this number are also prepared.

Description regarding these command panel 122i of bananas and command panel 122g of a number is similar to the above description regarding the command panel 122h of apples. However, it is necessary to apply the description while apples are replaced with bananas or a number.

While, in the arrangement illustrated in FIG. 11A, command panels 122e of apples are arranged as the third and the fifth command panels from the leftmost position, the number of apples of the respective command panels is added. In this manner, in a case where there are a plurality of pieces of command information of the same type as the first comparison command information, the command information of the same type is added.

In a similar manner, command panels 122g of numbers are arranged as the eighth and the tenth command panels from the leftmost position, and numerical values of the respective command panels are added. Further, command panels 122h of apples are arranged as the eleventh and the twelfth command panels from the leftmost position, and the number of apples of the respective command panels are added. In this manner, in a case where there are a plurality of pieces of command information of the same type as the second comparison command information, the command information of the same type is added.

Then, on the command panel 122c of a two-direction arrow arranged at a rightmost position, content of the same type is compared between the first comparison command information and the second comparison command information to determine whether the content matches each other. In a case where the content matches each other in all types, after the mobile robot 110 causes the light emitting portion 220 to emit light in light blue and causes notification sound (correct sound) which makes a notification that the content matches each other to be generated from the speaker 507, the mobile robot 110 moves in a direction of a light blue arrow (upward) drawn on this command panel 122c. In a case where content does not match each other between the first comparison command information and the second comparison command information in even one type among a plurality of types, the mobile robot 110 moves in a direction of a gray arrow (downward).

In a case of arrangement illustrated in FIG. 11A, because the first comparison command information is five apples, two bananas and a numerical value of 3, and the second comparison command information is also five apples, two bananas and a numerical value of 3, the content matches each other in all types. Therefore, the mobile robot 110 moves in a direction of a light blue arrow.

Figure 11B:
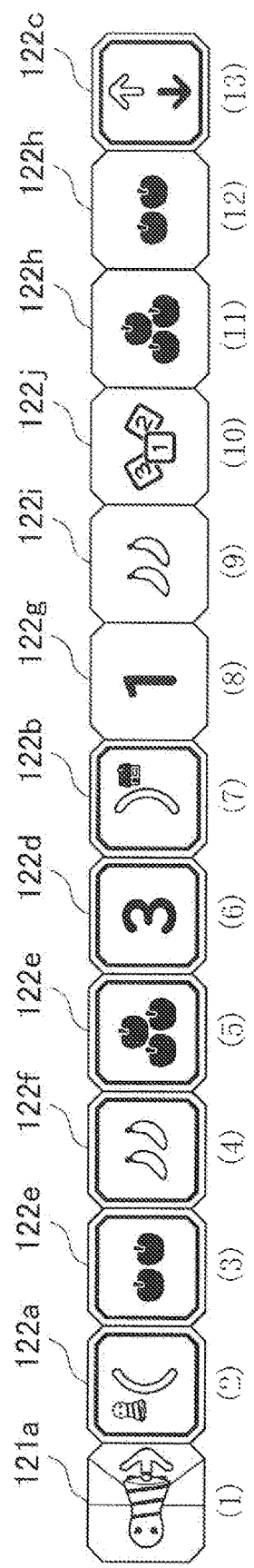

If arrangement illustrated in FIG. 11B is compared with the arrangement illustrated in FIG. 11A, the command panel with a picture of a number of 1 arranged as the tenth command panel from the leftmost position is replaced with the command panel 122j with a picture of a number of 3.

A numerical value randomly generated by this command panel 122j by the mobile robot 110 is added to numerical values read from all the command panels 122g of numbers arranged after the command panel 122b of a right parenthesis.

It is also possible to cause the light emitting portion 220 to blink in green the number of times corresponding to the randomly generated numerical value when the mobile robot 110 reaches this command panel 122j.

Further, it is also possible to cause the light emitting portion 220 to blink in light blue twice when the mobile robot 110 reaches this command panel 122j in a case where the first comparison command information whose type is a number matches a numerical value obtained by adding numerical values read from all the command panels 122g of numbers arranged after the command panel 122b of a right parenthesis to the randomly generated numerical value. Further, it is also possible to cause notification sound which makes a notification that the numbers match each other to be generated from the speaker 507. Then, also in a case where a state changes from a state where the numbers match each other to a state where the numbers do not match each other, it is also possible to cause notification sound which makes a notification that a state changes from the state where the numbers match each other to the state where the numbers do not match each other to be generated from the speaker 507.

When the mobile robot 110 which has started from the leftmost command panel 121a reaches the command panel 122c of a two-direction arrow arranged at a rightmost position, content of the same type is compared between the first comparison command information and the second comparison command information to determine whether the content matches each other.

In a case where a numerical value randomly generated at the command panel 122j arranged as the tenth command panel from the leftmost position is 2, concerning a plurality of types of command information of the first comparison command information and the second comparison command information, because content is five apples, two bananas and a numerical value of 3, the content matches each other in all types. As a result of this determination, the mobile robot 110 moves in a direction of a light blue arrow of the command panel 122c. In a case where the randomly generated numerical value is a numerical value other than 2, concerning command information of a type of a number of the first comparison command information and the second comparison command information, the content does not match each other. Therefore, the mobile robot 110 moves in a direction of a gray arrow. At this time, it is also possible to cause notification sound (incorrect sound) which makes a notification that the content does not match each other to be generated to make a notification of mismatch.

As described so far, the first comparison command information is constituted based on the command panel 122e of apples, the command panel 122f of bananas and the command panel 122d of a number. Meanwhile, the second comparison target information and the second comparison command information are constituted based on the command panel 122h of apples, the command panel 122i of bananas, the command panel 122g of a number, command panels 122j of numbers from 1 to 3, a command panel 122p of an elephant, and a command panel 122q of a monkey (see FIG. 12A).

Arrangement of eight command panels 121 illustrated in FIG. 12A will be described next.

The command panel 122q with a picture of a monkey is arranged as the seventh command panel from the left.

Description regarding this command panel 122q of a monkey is similar to the above description regarding the command panel 122p of an elephant. However, on this command panel 122q of a monkey, cry of a monkey is reproduced from the speaker 507. Further, it is necessary to apply the description while apples are replaced with bananas so that one is subtracted from a numerical value obtained by adding the number of bananas read from all the command panels 122i of bananas so far.

Subtraction of one from the number of bananas expresses image that one banana is given to a monkey.

In arrangement illustrated in FIG. 12A, the first comparison target information is constituted based on three command panels from the second to the fourth command panels from the leftmost position. Further, the first comparison command information is constituted based on the command panel 122f of two bananas arranged as the third command panel.

Meanwhile, the second comparison target information is constituted based on three command panels of the command panels 122i of bananas arranged as the fifth and the sixth command panels and the command panel 122q of a monkey arranged as the seventh command panel.

In the first comparison command information, the number of bananas is two. In the second comparison target information, the number of bananas is two as a result of one being subtracted from the number of bananas of three which is obtained by adding the number of bananas of the fifth and the sixth command panels 122i of bananas, by the seventh command panel 122q of a monkey. As a result, on the command panel 122c of a two-direction arrow arranged as the eighth command panel, it is determined that the first comparison command information matches the second comparison target information, and the mobile robot 110 moves in a direction of a light blue arrow.

Figure 12B:
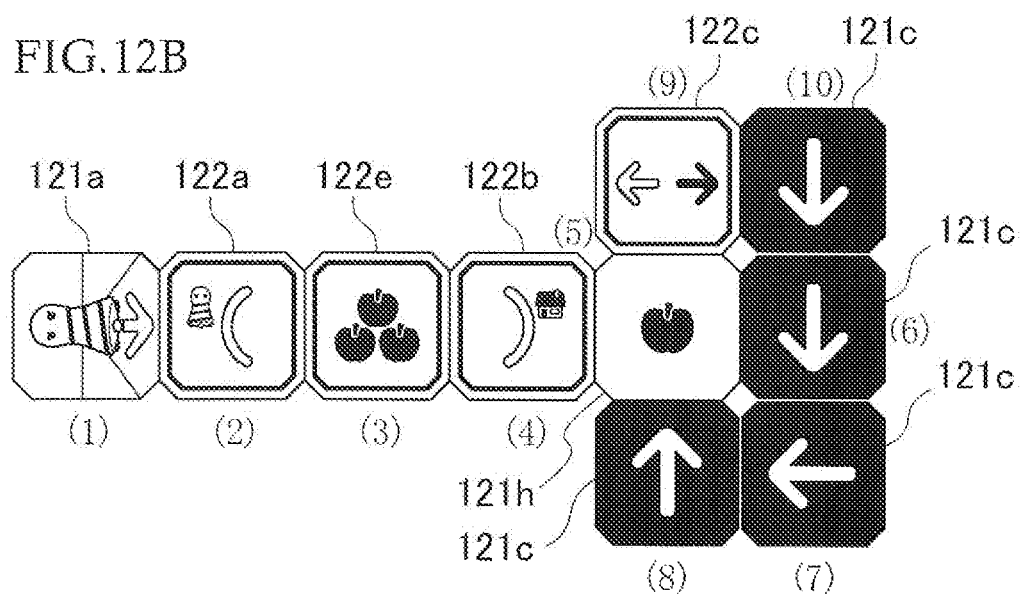

Arrangement of ten command panels 121 illustrated in FIG. 12B will be described next.

The first comparison target information is constituted based on three command panels from the second command panel to the fourth command panel from the leftmost command panel 121a arranged at the start position. Further, the first comparison command information is constituted based on the command panel 122e of three apples arranged as the third command panel.

Meanwhile, the second comparison target information is constituted based on the command panel 122h of one apple arranged as the fifth command panel.

When the mobile robot 110 which has started from the leftmost command panel 121a reaches the fifth command panel 122h of an apple, one is stored as the number of apples.

Thereafter, the mobile robot 110 moves in a direction of an arrow drawn on the command panel 121c and reaches the fifth command panel 122h of an apple again. At this time, the mobile robot 110 adds one to the number of apples, so that the number of apples becomes two.

Then, the mobile robot 110 reaches the adjacent command panel 122c of a two-direction arrow, determines that the numbers of apples do not match each other by comparing the number of apples between three in the first comparison command information and two in the second comparison target information, and moves in a direction of a gray arrow (rightward).

On this command panel 122c, the mobile robot 110 travels in a direction of a gray arrow until conditions that the first comparison command information matches the second comparison target information are satisfied, and, if the conditions are satisfied, the mobile robot 110 travels in a direction of a light blue arrow.

The mobile robot 110 moves in a direction of an arrow of the command panel 121c and reaches the command panel 122h of an apple arranged as the fifth command panel. At this time, the mobile robot 110 adds one to the number of apples, so that the number of apples becomes three.

If the mobile robot 110 reaches the command panel 122c of a two-direction arrow again, it is determined that the first comparison command information matches the second comparison target information, and the mobile robot 110 moves in a direction of a light blue arrow (leftward).

Arrangement of ten command panels 121 illustrated in FIG. 13A will be described next.

Figure 13A:
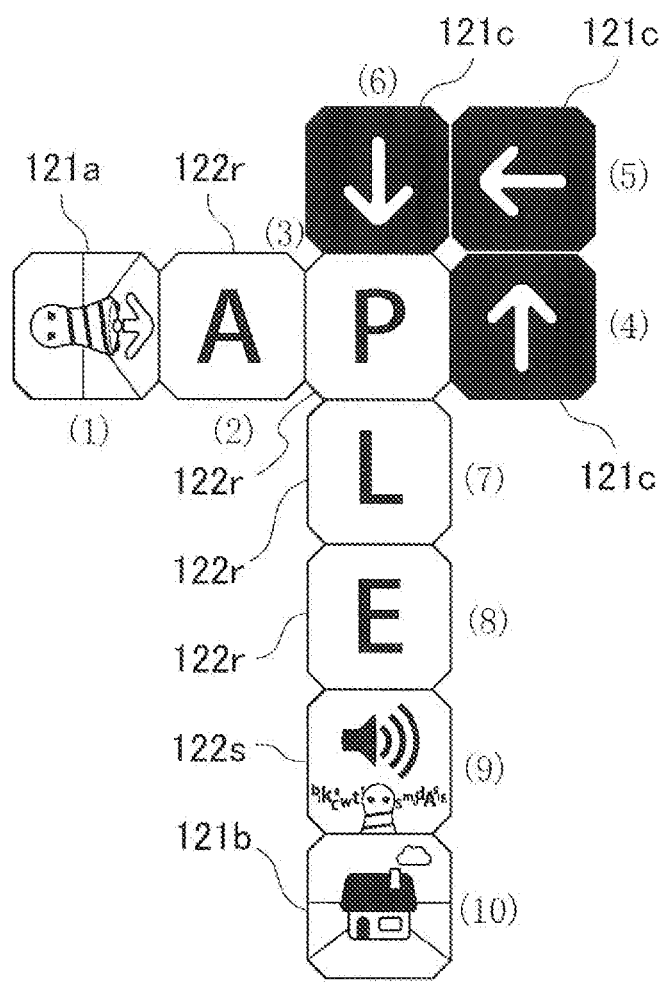
FIG. 13A is a view illustrating a plurality of command panels arranged in the traveling direction of the mobile robot.

FIG. 13A illustrates a command panel 122*r* with a picture of an alphabetical character, a command panel 122*s* with a picture of a speaker, or the like.

This command panel 122*r* of an alphabetical character includes command information for causing the mobile robot 110 to reproduce pronunciation of the drawn alphabetical character.

A command panel 122*r* of 'A' and a command panel 122*r* of 'P' are respectively arranged as the second and the third command panels from the leftmost command panel 121*a* arranged at the start position, and two command panels 122*r* of 'L' and 'E' are further arranged downward. When the mobile robot 110 reaches these command panels 122*r*, respective pronunciations are reproduced from the speaker 507.

As a picture of this command panel 122*r*, pictures of other alphabetical characters such as 'B' and 'C' are also prepared.

Figure 13B:
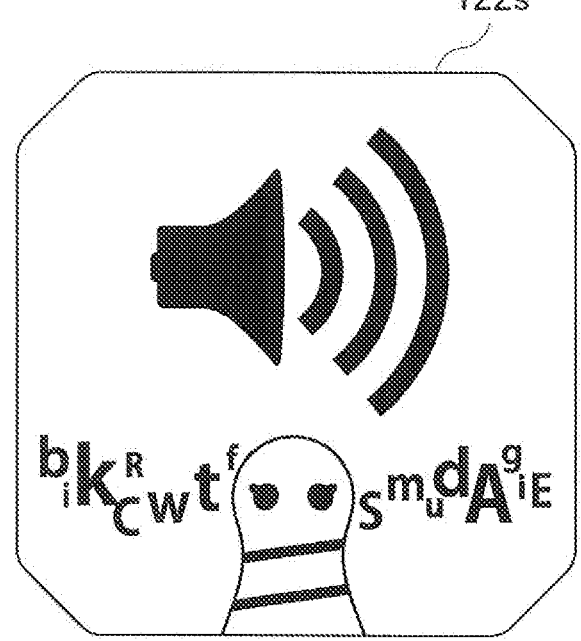
FIG. 13B is a view illustrating a command panel including command information for causing pronunciation of a word to be generated.

The command panel 122*s* with a picture of a speaker is arranged next to the command panel 122*r* of 'E' in the drawing. FIG. 13B illustrates a picture of this command panel 122*s*. Below the picture expressing a speaker, a picture expressing the mobile robot 110 is drawn, and a number of alphabetical characters are drawn on both sides of the picture of the mobile robot 110.

This command panel 122*s* of a speaker includes command information for causing the mobile robot 110 to generate pronunciation of a word constituted with arrangement of alphabetical characters of command panels 122*r* sequentially read after the mobile robot 110 starts movement.

In arrangement illustrated in FIG. 13A, the mobile robot 110 which starts from the leftmost command panel 121*a* reads command panels 122*r* of 'A' and 'P', and reproduces pronunciation of 'A' and 'P' on these panels 122*r*. Thereafter, the mobile robot 110 moves in directions of arrows of three command panels 121*c*, reads the command panel 122*r* of 'P' again, and subsequently, sequentially reads the command panels 122*r* of 'L' and 'E'. In this manner, the mobile robot 110 reads command panels 122*r* in order of 'A', 'P', 'P', 'L' and 'E', and this arrangement constitutes a word of 'APPLE'. Then, when the mobile robot 110 reaches a central portion on this command panel 122*s* of a speaker, the mobile robot 110 temporarily stops at that position, and pronunciation of 'APPLE' is reproduced from the speaker 507. As this sound, instead of the read alphabetical characters being individually and successively reproduced, pronunciation of a word constituted with the read alphabetical characters is reproduced. Thereafter, the mobile robot 110 starts movement, stops at a central portion of the command panel 121*b* at the goal position, which is arranged at the end, and finishes a series of operation.

The control unit 501 causes the command information read by the mobile robot 110 from the command panels 122*r* of alphabetical characters to be sequentially stored in the command information memory 508. Then, when the mobile robot 110 reaches the command panel 122*s* of a speaker, the control unit 501 reads out the command information read from the command panels 122*r* of alphabetical characters stored in the command information memory 508 to cause pronunciation of a word constituted with arrangement in a read order to be reproduced from the speaker 507. Note that sound data of pronunciation of a word to be reproduced is stored in a control unit ROM (flash memory) 521, or the like, of the mobile robot 110 in advance.

The learner can learn alphabetical characters and their pronunciation by learning using the command panel 122*r* of an alphabetical character. Further, by combining a plurality of command panels, the learner can create a character string. Then, by learning using the command panel 122*s* of a speaker, the learner can learn correct pronunciation of a word constituted with the character string.

Note that a word may be words in other language as well as English words. Further, a character in the picture of the command panel 122*r* may be other characters such as Japanese syllabary characters other than alphabetical characters.

Arrangement of fourteen command panels 121 illustrated in FIG. 14 will be described next.

Three pieces of command information respectively recorded on three command panels 121 from the second command panel to the fourth command panel from the command panel 121*a* arranged at the start position constitute the first comparison target information. Among these, the command information recorded in the third command panel 122*e* of an apple put between the second command panel 122*a* of a left parenthesis and the fourth command panel 122*b* of a right parenthesis corresponds to the first comparison command information.

Further, command information recorded in four command panels 122*r* of 'A', 'P', 'L' and 'E' arranged after the fourth command panel 122*b* of a right parenthesis constitutes the second comparison target information.

Figure 14:
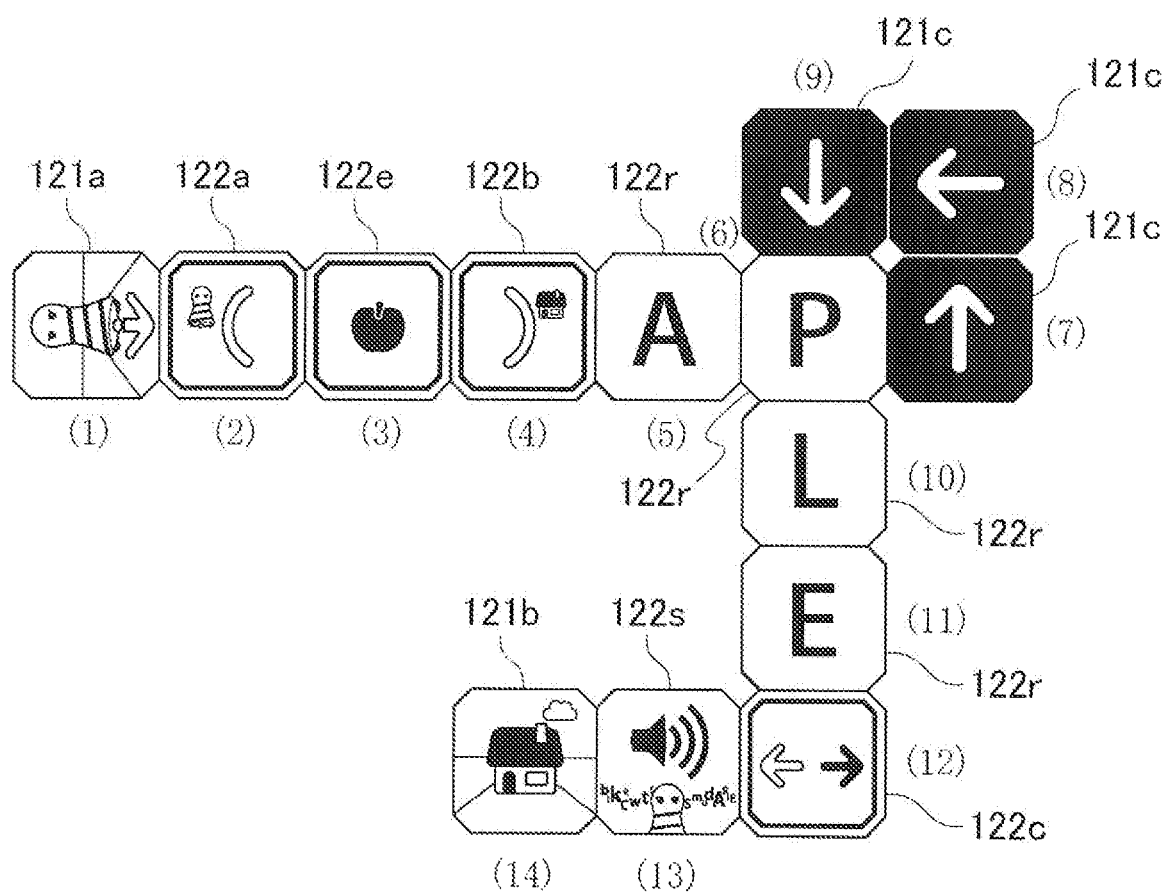
FIG. 14 is a plan view illustrating an example of a plurality of command panels arranged in the traveling direction of the mobile robot according to the embodiment.

In the arrangement illustrated in FIG. 14, the mobile robot 110 which starts from the leftmost command panel 121*a* reads the third command panel 122*e* of an apple and a plurality of command panels 122*r* of alphabetical characters arranged as the fifth and subsequent command panels. Because these command panels 122*r* of alphabetical characters are sequentially read while the mobile robot 110 moves in directions of arrows of the three command panels 121*c*, the command panel 122*r* of 'P' is read twice next to 'A', so that order becomes 'A', 'P', 'P', 'L' and 'E'.

When the mobile robot 110 reaches the command panel 122*c* of a two-direction arrow, command information of the third command panel 122*e* of an apple which is the first comparison command information is compared with command information read from a plurality of command panels 122*r* of alphabetical characters which is the second comparison target information. Spelling of an English word corresponding to an apple which is a picture of this command panel 122*e* of an apple is 'APPLE'. It is determined whether this spelling matches arrangement of 'A', 'P', 'P', 'L' and 'E' constituted in a read order of the plurality of command panels 122*r* of alphabetical characters. In a case where it is determined that the spelling matches the arrangement, the mobile robot 110 moves in a direction of a light blue arrow (leftward) drawn on this command panel 122*c* of a two-direction arrow, and, in a case where it is determined that the spelling does not match the arrangement, the mobile robot 110 moves in a direction of a gray arrow (rightward).

In the arrangement in FIG. 14, because the spelling matches the arrangement, the mobile robot 110 moves in a direction of a light blue arrow (leftward), and pronunciation of 'APPLE' is reproduced on the next command panel 122*s* of a speaker. The mobile robot 110 moves to the command panel 121*b* at the goal position at the end, stops on the command panel 121*b* and finishes a series of operation.

The control unit 501 causes the command information (first comparison command information) of the command panel 121 including information of a picture, such as a command panel 122*e* of an apple put between the command panel 122*a* of a left parenthesis and the command panel 122*b* of a right parenthesis to be stored in the command information memory 508. Further, the control unit 501 causes the command information (second comparison target information) of the command panels 122*r* of alphabetical characters arranged after the command panel 122*b* of a right parenthesis to be sequentially stored in the command information memory 508.

Then, when the mobile robot 110 reaches the command panel 122*c* of a two-direction arrow, the control unit 501 reads out the first comparison command information and the second comparison target information stored in the command information memory 508 and compares the spelling of a word of a picture of the command panel 121 corresponding to the first comparison command information with the arrangement in a read order of alphabetical characters of the command panels 122*r* corresponding to the second comparison target information. As a result of this comparison, if the spelling matches the arrangement, the mobile robot 110 is caused to move in a direction of a light blue arrow, while, if the spelling does not match the arrangement, the mobile robot 110 is caused to move in a direction of a gray arrow (rightward).

Note that the spelling of the word to be compared may be words in other language such as Japanese other than English.

The learner can learn spelling of a word while changing arrangement of the command panels 122*r* of alphabetical characters. Further, this will be training for developing a solution so as to obtain a correct word.

As a picture to be used for learning spelling of a word, various pictures of vehicles such as an automobile, a train and an airplane, animals such as a cat and a dog, instruments such as a piano and a trumpet, or the like, are prepared. Therefore, the learner can master spelling of various words.

In the above description, spelling of a word corresponding to a picture of the command panel 121 is compared with arrangement of alphabetical characters in a read order from a plurality of command panels 122*r* to determine whether content matches each other. Other than the above comparison, it is also possible to compare meaning indicated by the picture of the command panel 121 with meaning indicated by arrangement of alphabetical characters in a read order from a plurality of command panels 122*r* to determine whether content matches each other.

<Method for Using Learning Toy>

A method for learning using the learning toy 100 according to this embodiment will be described next.

The learner first arranges the command panel 121*a* for a start point on a floor surface, or the like.

Then, desired command panels 121 are sequentially arranged adjacent to this command panel 121*a*.

Further, the command panel 121*b* for a goal point is arranged at the last position of a line of the command panels 121.

Then, when the power supply switch 503 of the mobile robot 110 is switched on, and the mobile robot 110 is put on the command panel 121*a* for a start point, this mobile robot 110 starts movement. By this means, the mobile robot 110 sequentially reads the command information of the command panels 121 while moving along the movement path 120 and sequentially executes operation based on the command information.

As a result of these kinds of operation, if this mobile robot 110 reaches the command panel 121*b* for a goal point and stops, the operation is 'successful'. Meanwhile, if the mobile robot 110 cannot reach the command panel 121*b*, the operation 'fails'.

The learner can enjoy learning programming using this learning toy 100. How the learner can learn programming by arranging a plurality of different command panels 121 to cause the mobile robot 110 which self-travels on the command panels 121 to perform desired operation, will be described as the following correspondence relationship.

Considering by the learner what kind of operation is caused to be performed by the mobile robot 110 corresponds to programming design. Then, work of arranging the command panels 121 corresponds to implementation of programming. Subsequently, causing the mobile robot 110 to self-travel on the command panels 121 to execute operation corresponds to execution of the program. Still further, as a result of causing the mobile robot 110 to perform operation, if there is a failure, it is necessary to change selection of the command panels 121 or change the arrangement positions, which corresponds to debug work of the program.

Specific learning action by the learner is as follows.

First, the learner considers what kind of operation is caused to be performed by the mobile robot 110 (programming design). After determining the operation which is caused to be performed by the mobile robot 110, the learner selects an optimal command panel 121 while imaging operation of the mobile robot 110 from a picture drawn on the command panel 121 and arranges the command panel 121 at an optimal position and in an optimal direction (implementation of programming). After the learner completes arrangement of the command panels 121, the learner causes the mobile robot 110 to actually perform operation to confirm whether the operation matches operation of the mobile robot 110 designed by himself/herself (execution of the program). If the operation of the mobile robot 110 is beyond the scope of the assumption, the learner selects an optimal command panel 121 again, rearranges the command panel 121 at an optimal position and in an optimal direction to correct the operation so that the mobile robot 110 performs operation as designed (debug work of the program).

Figure 15:
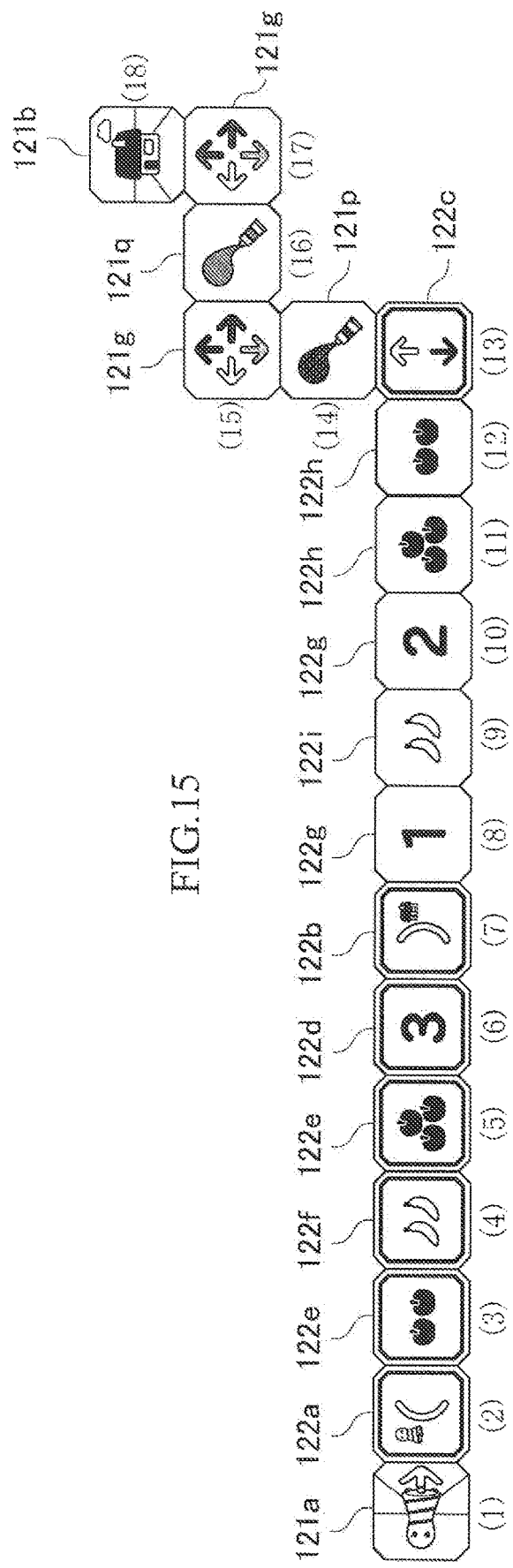
FIG. 15 is a plan view illustrating an example of a plurality of command panels arranged in the traveling direction of the mobile robot according to the embodiment, and is a view including a command panel arranged at a start position and a command panel arranged at a goal position.

For example, a case where the learner arranges the command panels 121 as illustrated in FIG. 15 will be described.

Arrangement of the command panels 121 from the leftmost command panel to the thirteenth command panel in FIG. 15 is the same arrangement as the above-described arrangement illustrated in FIG. 11A. Further, arrangement of the command panels 121 from the fourteenth command panel to the seventeenth command panel in FIG. 15 is the same arrangement as the above-described arrangement of the command panels from the second command panel to the fifth command panel illustrated in FIG. 8B. Further, the command panel 121*b* for a goal position is arranged as the last eighteenth command panel in FIG. 15.

If the mobile robot 110 which is put on the command panel 121*a* for a start position and starts, reaches a central portion of the thirteenth command panel 122*c* of a two-direction arrow, the first comparison command information is compared with the second comparison command information. As described using FIG. 11A, both the first comparison command information and the second comparison command information have information of five apples, two bananas, and a numerical value of 3, the first comparison command information matches the second comparison command information in all types. Therefore, the mobile robot 110 moves in a direction of a light blue arrow (upward).

Further, if the mobile robot 110 reaches the command panel 121*q* of cyan of three primary colors arranged as the sixteenth command panel in FIG. 15, as described using FIG. 8B, the light emitting portion 220 emits light in blue which is a mixed color of magenta of the fourteenth command panel and cyan of the sixteenth command panel.

Subsequently, if the mobile robot 110 reaches the command panel 121g of a four-direction arrow arranged as the next seventeenth command panel, because a color of light emitted from the light emitting portion 220 is blue, the mobile robot 110 travels in a direction of a blue arrow (upward).

Then, the mobile robot 110 reaches the command panel 121b arranged at a goal position at the end and stops movement.

<Effects of Learning Toy>

In this embodiment, because the mobile robot 110 is caused to operate based on the command information of a plurality of command panels 121, it is possible to create high-level programming such as programming in which reading of the command information and operation of the mobile robot 110 based on the command information are performed at a time interval as well as simple programming in which the command information is sequentially read, and operation of the mobile robot 110 is sequentially executed based on the read command information. Because it is possible to adjust a difficulty level of programming in a stepwise manner from simple one to high-level one, older children as well as younger infants can learn with this toy. As a result, it is possible to realize usage of the toy over a long period of time in accordance with development stages of children.

Further, according to this embodiment, the mobile robot 110 performs desired operation by automatically extracting command information from a plurality of pieces of read command information stored in the command information memory 508. Therefore, it is possible to realize programming in which operation of the mobile robot 110 does not follow a read order of the command information. As a result, it is possible to design higher-level programming, so that it is possible to learn higher-level programming.

Further, according to this embodiment, the mobile robot 110 includes a light emitting element which causes the light emitting portion 220 of the mobile robot 110 to emit light based on a plurality of pieces of command information, and a speaker 507 which generates sound. Therefore, it is possible to aurally and visually confirm light emission and sound generation of the mobile robot 110, so that it is possible to easily verify whether the mobile robot 110 operates as designed in programming assumed by the learner. Further, it is also possible to perform programming while taking into account relationship of three primary colors concerning light emission of the light emitting portion 220 of the mobile robot 110, so that it is possible to realize learning of higher-level programming and learning of three primary colors. Further, it is also possible to enable programming while taking into account relationship of three primary light colors as well as three primary colors so as to enable learning of three primary light colors.

Still further, according to this embodiment, the mobile robot 110 can restrict or allow an application range of the command information which becomes effective as operation to be programmed in a stepwise manner by selecting a type of the command panels 121 to be used for learning. Therefore, it is possible to realize learning of programming in accordance with development stages of the learner.

Still further, according to this embodiment, because it is possible to increase types of command information to be recorded in the command panel 121, it is possible to command the mobile robot 110 to perform more variety of operation. As a result, it is possible to realize learning of a variety of and high-level programming. Further, because it is possible to sell the command panel 121 alone, the learner can additionally purchase the command panel 121 as necessary.

Further, according to this embodiment, the command panel 121 has a shape in which corner portions of a square are cut out. Because an angle of the corner portion becomes an obtuse angle, even if the command panel 121 drops and the corner portion is hit, the command panel 121 is less likely to be broken, and the learner is less likely to get injured, so that safety is improved.

In this embodiment, a plurality of pieces of command information read by the mobile robot 110 from a plurality of command panels 121 constitute the first comparison target information and the second comparison target information. The control unit 501 of the mobile robot 110 detects the first comparison target information and the second comparison target information from the plurality of pieces of read command information, compares the first comparison target information with the second comparison target information, determines whether the first comparison target information matches the second comparison target information, and causes the mobile robot 110 to perform desired operation based on a result of the comparison and the determination.

Therefore, it is possible to create high-level programming in which command information recorded in part of command panels 121 is compared with command information recorded in the other part of the command panels 121 among a plurality of the arranged command panels 121, and the mobile robot 110 is caused to operate based on a result of the comparison and the determination, as well as simple programming in which the command information recorded in the command panels 121 is sequentially read and operation of the mobile robot 110 is sequentially executed in accordance with the read command information. Because a difficulty level of programming can be adjusted in a stepwise manner from simple one to high-level one, older children as well as younger infants can learn with this learning toy 100.

Further, because the first comparison target information and the second comparison target information can include information of numerical values, the learner can learn high-level programming including calculation of numerical values and comparison of calculation results.

As a result, it is possible to realize usage of this learning toy 100 over a long period of time in accordance with development stages of children.

Further, according to this embodiment, the first comparison target information includes the start position command information, the end position command information, and one or more pieces of first comparison command information recorded in one or more command panels 121. Then, this one or more pieces of first comparison command information is compared with the second comparison target information. One or more pieces of first comparison command information can be changed in various manners by changing the number or types of command panels 121.

Therefore, the learner can learn while changing one or more pieces of first comparison command information by changing the command panels 121 to be arranged in various manners. In this manner, the learner can learn high-level and a variety of programming.

Further, according to this embodiment, a plurality of pieces of first comparison command information and a plurality of pieces of second comparison command information are constituted with a plurality of types indicating information of numerical values and pictures. The plurality of pieces of first comparison command information are respectively compared with the plurality of pieces of second comparison command information for each corresponding type among the plurality of types.

The learner can learn while constituting the plurality of pieces of first comparison command information and the plurality of pieces of second comparison command information so as to include a plurality of types. In this manner, the learner can learn high-level and complicated programming.

Further, according to this embodiment, a plurality of pieces of command information can be stored in the command information memory 508 provided at the mobile robot 110, and the stored command information can be read out. This expresses operation of substituting a value into a variable of a program and reading out the value, which is operation of storing a value in a variable which is a memory, and thereafter reading out the value from the memory. Therefore, the learner can learn variables of programming by causing the mobile robot 110 to perform operation based on a plurality of pieces of command information and observing the operation.

Particularly, through learning using command panels 122*d* and 122*g* on which pictures of numerical values are drawn, it is possible to cause the mobile robot 110 to store numerical values and read out the stored numerical values to perform calculation and comparison. The learner can learn substitution of a numerical value into a variable of programming and reading out of the numerical value by substituting a numerical value into a memory as a variable and reading out the numerical value to perform comparison.

Further, the first comparison target information is compared with the second comparison target information to determine whether the first comparison target information matches the second comparison target information, and the mobile robot 110 performs operation based on a result of the determination. If it is assumed that the first comparison target information and the first comparison command information indicate content of conditions, it can be said that the second comparison target information satisfies the content of the conditions. Therefore, the learner can learn setting of conditions of programming and comparison of conditions through content of the first comparison target information and the first comparison command information, and the conditions which are set in various manners by the second comparison target information.

Further, the mobile robot 110 successively reproduces scales of music notes read so far once by the command panel 122*d* of one large music note. When the mobile robot 110 passes through the command panel 122*a* of a music note and staff notation, the scale of the music note is reproduced. Therefore, the scales of the notes are repeatedly reproduced by this command panel 122*d*. By observing this operation, the learner can learn repetition processing of programming.

Further, according to this embodiment, the mobile robot 110 reads a plurality of command panels 122*r* of alphabetical characters in which command information including information of alphabetical characters is recorded, and pronunciation of a word constituted by arrangement of the alphabetical characters in a read order is reproduced. Therefore, the learner can learn various words and correct pronunciation of the words by rearranging a plurality of command panels 122*r* of alphabetical characters. In this manner, the learner can learn high-level programming and also can learn words.

Further, according to this embodiment, for example, the mobile robot 110 reads a command panel 122*e* of an apple in which command information including information of a picture of an apple is recorded, and a plurality of command panels 122*r* of alphabetical characters, in which command information including information of alphabetical characters is recorded, spelling ('APPLE') of a word corresponding to the information of the picture of the apple is compared with arrangement of the alphabetical characters in a read order, it is determined whether the spelling matches the arrangement, and the movement direction of the mobile robot 110 changes based on a result of the determination. Therefore, the learner can recognize whether spelling of a word corresponding to a picture matches arrangement of alphabetical characters constituted by arranging a plurality of command panels 122*r* of alphabetical characters through a movement direction of the mobile robot 110. The learner can learn correct spelling of a word by rearranging a plurality of command panels 122*r* of alphabetical characters. In this manner, the learner can learn high-level programming, and can also learn spelling of words and a character string of syntax of a program.

As described above, the learner can learn variables, setting of conditions, repetition processing and a character string which are syntax of programming through learning using this learning toy 100.

REFERENCE SIGNS LIST 100 learning toy
110 mobile robot
120 movement path
121 command panel
211 body portion
212 bottom portion
220 light emitting portion
222 bottom portion cover attaching screw
223 appearance member attaching screw
230 moving mechanism
231 rotating leg
232 auxiliary ball
240 optical reading module
250 appearance member
401 motor
500 control circuit
501 control unit
502 RGB light source
503 power supply switch
505 motor controller
506 sound reproducing unit
507 speaker
508 command information memory
520 CPU
521 control unit ROM (flash memory)
522 control unit RAM

The invention claimed is:

1. A learning toy comprising:
a mobile body; and
a plurality of command panels, in which respective command information, which is a command of operation for the mobile body, is recorded, the plurality of command panels successively arrangeable, and the mobile body is to read the respective command information while self-traveling on the command panels, and operate based on the read command information,
the mobile body including,
a moving unit to self-travel on the command panels;
a reading unit to read the respective command information recorded in the command panels;
a storage unit to store the read command information; and a control unit to cause the mobile body to operate based on the read command information, the reading unit to read the respective command information being recorded in the plurality of command panels when successively arranged, a command panel, among the command panels, having a picture corresponding to the command information drawn on a surface of the command panel, the storage unit to store a plurality of pieces of the read command information, and the control unit to control the mobile body to change an operation of the mobile body to be performed based on, content of a second reading of command information read from a command panel, from among the plurality of command panels, at which the mobile body is located, and content of a first reading of command information previously read before reaching the command panel at which the mobile body is located.

2. The learning toy according to claim 1, wherein the mobile body includes a light emitting element to cause a body of the mobile body to emit light, and the plurality of command panels include a command panel of a picture in yellow having command information indicating yellow, a command panel of a picture in magenta having command information indicating magenta, and a command panel of a picture in cyan having command information indicating cyan, when a combination of any two of the command panels of the picture in yellow, the command panel of the picture in magenta, and the command panel of the picture in cyan is arranged, in a case that the mobile body passes through the command panels of the combination, the control unit controls the light emitting element to emit light on a previously-read command panel of the combined two command panels in a color of the picture of the previously-read command panel, and controls the light emitting element to emit light on a later-read command panel of the combined two command panels in a color of mixture of the color of the picture of the previously-read command panel and a color of the picture of the later-read command panel, and the color of mixture is red in the combination of the command panel of the picture in yellow and the command panel of the picture in magenta, blue in the combination of the command panel of the picture in magenta and the command panel of the picture in cyan, and green in the combination of the command panel of the picture in cyan and the command panel of the picture in yellow.

3. The learning toy according to claim 2, wherein the plurality of command panels include a command panel of a picture of four arrows each in a different color and a different direction, the control unit to control the mobile body to move in the direction of an arrow, from among the four arrows, on the command panel in a same color as a color of the emitted light of the light emitting element, and the control unit to control the mobile body to move in the direction of the arrow in the same color as the color of the emission light of the light emitting element when the mobile body reaches the command panel of the four-arrow picture after passing through the combined two command panels.

4. The learning toy according to claim 1, wherein the plurality of command panels include a command panel of a picture of a key and a command panel of a picture of a door having a keyhole, the command panel of the key picture has command information causing the mobile body to store a number of times of passing of the mobile body through the command panel of the key picture, the command panel of the door picture has command information causing the mobile body to check whether the number of times of passing of the mobile body through the command panel of the key picture is equal to or more than a predetermined number, and the control unit, causes the storage unit to store the number of times of passing when the mobile body passes through the command panel of the key picture, checks whether the number of times of passing through the command panel of the key picture is equal to or more than the predetermined number when the mobile body reaches the command panel of the door picture, and causes the mobile body to move straight when the number of times of passing is equal to or more than the predetermined number and to perform error operation when the number of times of passing is less than the predetermined number.

5. The learning toy according to claim 1, wherein the plurality of command panels include a command panel of a picture of a number and an arrow, the control unit to control the mobile body to move in a direction of the arrow on the command panel of the number-arrow picture, when the mobile body passes through the command panel of the number-arrow picture a number of times as the number on the command panel of the number-arrow picture, and when the mobile body reaches the command panel of the number-arrow picture, the control unit is to check a number of times of passing of the mobile body through the command panel of the number-arrow picture, and cause the mobile body to move in the direction of the arrow when the number of times of passing is equal to the number on the command panel of the number-arrow picture and to continue moving irrelevantly to the direction of the arrow when the number of times of passing is not equal to the number on the command panel of the number-arrow picture.

6. The learning toy according to claim 1, wherein the plurality of command panels include a command panel of a picture of three serially-arranged rectangles, the control unit to control the mobile body to skip a subsequent command panel to pass therethrough after passing through the three-rectangle command panel, and the control unit to control the mobile body to continue to move while ignoring the subsequent command panel when the mobile body reaches the subsequent command panel after passing through the three-rectangle command panel, and to operate based on the command information of a subsequent command panel when the mobile body reaches the subsequent command panel after passing through the command panel other than the three-rectangle command panel.

7. The learning toy according to claim 1, wherein the mobile body includes a light emitting element to cause a body of the mobile body to emit light, the plurality of command panels include a command panel of a picture of numbers 1, 2, and 3 and a command panel of a picture of four arrows each in a different color and a different direction, the command panel of the numbers 1, 2, and 3 has command information to cause any of the numbers 1, 2, and 3 to be randomly generated, and cause the light emitting element to emit light in yellow when the randomly generated number is 1, to emit light in blue when the randomly generated number is 2, and to emit light in magenta when the randomly generated number is 3, the command panel of the four-arrow picture has command information causing the mobile body to move in the direction of the arrow on the command panel of the four-arrow picture in a same color as a color of the emitted light of the light emitting element, and the control unit to control any of the numbers 1, 2, and 3 to be randomly generated and the light emitting element to emit light in accordance with the randomly generated number, when the mobile body passes through the command panel of the numbers 1, 2 and 3, and to control the mobile body to move in a direction of an arrow, from among the four arrows, in a same color as the color of the emission light of the light emitting element when the mobile body reaches the command panel of the four arrows.

8. The learning toy according to claim 1,
wherein the plurality of command panels include a command panel of a picture of one arrow and a command panel of a picture of two arrows in a ring shape,
the one-arrow command panel has command information causing a moving direction of the mobile body to be determined,
the ring-shaped two-arrow command panel has command information causing a reverse interpretation that, when the mobile body reaches the command panel of the one-arrow picture after passing through the command panel of the ring-shaped two-arrow picture, the mobile body is caused to move in a direction from a leading end toward a base end of the arrow,
the control unit to control the mobile body to move from the leading end toward the base end of the arrow, when the mobile body reaches the command panel of the one-arrow picture after passing through the command panel of the ring-shaped two-arrow picture, and to move from the base end toward the leading end of the arrow when the mobile body reaches the command panel of the one-arrow picture without passing through the command panel of the ring-shaped two-arrow picture.

9. The learning toy according to claim 1,
wherein the mobile body includes a light emitting element to cause a body of the mobile body to emit light,
the plurality of command panels include a command panel of a picture of an apple,
the command panel of the apple picture has command information indicating a number of apples thereon, and
the control unit to control the light emitting element, when the mobile body reaches the command panel of the apple picture, to blink a number of times equal to a total number of apples obtained by adding the number of apples on the command panel of the apple picture at which the mobile body is located to a sum of apples on one or more command panels of apple pictures through which the mobile body has passed.

10. The learning toy according to claim 9,
wherein the plurality of command panels include a command panel of a picture of an elephant,
the command panel of the elephant picture has command information subtracting one from the sum of apples on the one or more command panels of the apple picture, and
the control unit to control the light emitting element, when the mobile body reaches the command panel of the elephant picture, to blink a number of times equal to a number obtained by subtracting one from the sum of apples on the one or more command panels of the apple picture through which the mobile body has passed.

11. The learning toy according to claim 1,
wherein the mobile body includes a light emitting element to cause a body of the mobile body to emit light,
the plurality of command panels include a command panel of a picture of a banana,
the command panel of the banana picture has command information indicating a number of the bananas thereon, and
the control unit to control the light emitting element, when the mobile body reaches the command panel of the banana picture, to blink a number of times equal to a total number of bananas obtained by adding the number of bananas on the command panel of the banana picture at which the mobile body is located to a sum of bananas on one or more command panels of the banana picture through which the mobile body has passed.

12. The learning toy according to claim 11,
wherein the plurality of command panels include a command panel of a picture of a monkey,
the command panel of the monkey picture has command information subtracting one from the sum of bananas on the one or more command panels of the banana picture, and
the control unit to control the light emitting element, when the mobile body reaches the command panel of the monkey picture, to blink a number of times equal to a number obtained by subtracting one from the sum of bananas on the one or more command panels of the banana picture through which the mobile body has passed.

13. The learning toy according to claim 12,
wherein the mobile body includes a light emitting element which causes a body of the mobile body to emit light or a speaker which causes sound to be generated from the mobile body based on the read command information.

14. A learning toy comprising:
a mobile body; and
a plurality of command panels, in which respective command information, which is a command of operation for the mobile body, is recorded, the plurality of command panels successively arrangeable, and the mobile body is to read the respective command information while self-traveling on the command panels, and operate based on the read command information,
the mobile body including,
a moving unit to self-travel on the command panels;
a reading unit to read the respective command information recorded in the command panels;
a storage unit to store the read command information; and
a control unit to cause the mobile body to operate based on the read command information,
the reading unit to read the respective command information being recorded in the plurality of the command panels when successively arranged, a command panel, among the command panels, having a picture of two arrows each in a different color and a different direction drawn on a surface of the command panel, the respective command information recorded in the plurality of command panels including, first comparison target information which is constituted with one or more pieces of the command information and which includes information of a numerical value or a picture; and second comparison target information which is constituted with one or more pieces of the command information indicating information of the numerical value or the picture and which is to be compared with the first comparison target information to determine whether predetermined conditions are satisfied, the storage unit to store a plurality of pieces of the read command information, and the control unit to control the mobile body, when the mobile body reaches the command panel of the two-arrow picture, by, detecting the first comparison target information and the second comparison target information from the plurality of pieces of the read command information, comparing the first comparison target information with the second comparison target information to determine whether the predetermined conditions are satisfied, and causing the mobile body to move in a direction of an arrow of the two arrows in the different colors, based on a result of the comparing.

15. The learning toy according to claim 14,
wherein the first comparison target information constituted with three or more pieces of the command information recorded in three or more of the command panels is constituted with:

start position command information which is the command information indicating a start position of the first comparison target information;

end position command information which is the command information indicating an end position of the first comparison target information; and one or more pieces of first comparison command information which is constituted with one or more pieces of the command information recorded in one or more command panels put between the two command panels in which the start position command information and the end position command information are respectively recorded, and which is to be compared with the second comparison target information to determine whether the predetermined conditions are satisfied.

16. The learning toy according to claim 15,
wherein a plurality of pieces of the first comparison command information constituted with a plurality of pieces of the command information recorded in a plurality of the command panels put between the two command panels in which the start position command information and the end position command information are respectively recorded, and a plurality of pieces of second comparison command information which are a plurality of pieces of the command information constituting the second comparison target information are respectively constituted with a plurality of types indicating information of the numerical value or the picture, and the control unit to respectively compare the plurality of pieces of the first comparison command information with the plurality of pieces of the second comparison command information for each corresponding type among the plurality of types to determine whether the predetermined conditions are satisfied.

17. The learning toy according to claim 15,
wherein a left parenthesis, a small picture expressing the mobile body on a left side of the left parenthesis, and a light blue frame to enclose the left parenthesis and the picture expressing the mobile body are drawn on the command panel in which the start position command information is recorded, and a right parenthesis, a small picture expressing a house on a right side of the right parenthesis, and a light blue frame to enclose the right parenthesis and the picture expressing the house are drawn on the command panel in which the end position command information is recorded.

18. The learning toy according to claim 15,
wherein a light blue frame is drawn on the command panel in which the first comparison command information is recorded.

19. The learning toy according to claim 16,
wherein a left parenthesis, a small picture expressing the mobile body on a left side of the left parenthesis, and a light blue frame to enclose the left parenthesis and the picture expressing the mobile body are drawn on the command panel in which the start position command information is recorded, and a right parenthesis, a small picture expressing a house on a right side of the right parenthesis, and a light blue frame to enclose the right parenthesis and the picture expressing the house are drawn on the command panel in which the end position command information is recorded.

20. The learning toy according to claim 16,
wherein a light blue frame is drawn on the command panel in which the first comparison command information is recorded.

21. The learning toy according to claim 14,
wherein the mobile body includes a light emitting element to cause a body of the mobile body to emit light, and when the mobile body reaches the command panel of the two-arrow picture, the control unit is to cause the light emitting element to emit light based on the result of the comparing.

22. The learning toy according to claim 14,
wherein the mobile body includes a speaker to generate sound, and when the mobile body reaches the command panel of two-arrow picture, the control unit is to cause the speaker to generate notification sound based on the result of the comparing.

23. The learning toy according to claim 14,
wherein the mobile body includes a light emitting element which causes a body of the mobile body to emit light or a speaker which causes sound to be generated from the mobile body based on the read command information.

24. A learning toy comprising:
a mobile body; and
a plurality of command panels, in which respective command information, which is a command of operation for the mobile body, is recorded, the plurality of command panels successively arrangeable, and the mobile body is to read the respective command information while self-traveling on the command panels, and operate based on the read command information, the mobile body including, a moving unit to self-travel on the command panels;

a reading unit to read the respective command information recorded in the command panels;

a storage unit to store the read command information;

a control unit to cause the mobile body to operate based on the read command information; and a speaker to cause sound to be generated from the mobile body based on the read command information, the reading unit to read the respective command information being recorded in the plurality of the command panels when successively arranged, the respective read command information including information of characters recorded in the plurality of the command panels, the storage unit to store a plurality of pieces of the read command information including the information of the characters read from the plurality of the command panels, and the control unit to control the mobile body to read the plurality of pieces of the command information including the information of the characters stored in the storage unit and causing pronunciation of a word to be generated from the speaker as reading sound data of the pronunciation of the word from the mobile body when arrangement of the information of the characters in an order read from the plurality of the command panels matches the word previously stored in the mobile body, and pronunciation of a word not to be generated from the speaker when the arrangement does not match the previously-stored word.

25. A learning toy, comprising:

a mobile body; and a plurality of command panels, in which respective command information, which is a command of operation for the mobile body, is recorded, the plurality of command panels successively arrangeable, and the mobile body is to read the respective command information while self-traveling on the command panels, and operate based on the read command information, the mobile body including, a moving unit to self-travel on the command panels;

a reading unit to read the respective command information recorded in the command panels;

a storage unit to store the read command information; and a control unit to cause the mobile body to operate based on the read command information, the reading unit to read the respective command information being recorded in the plurality of the command panels when successively arranged, the respective read command information including information of a picture or characters recorded in the plurality of the command panels, the plurality of command panels including a command panel having a surface on which a picture of two arrows each in a different color and a different direction is drawn, the storage unit to store a plurality of pieces of the read command information including the information of the picture or the characters read from the plurality of the command panels, and the control unit to control the mobile body, when the mobile body reaches the command panel of the two-arrow picture, by, reading the plurality of pieces of the command information including the information of the picture or the characters stored in the storage unit, comparing spelling of a word corresponding to the information of the picture with arrangement of the information of the characters in an order read from the plurality of the command panels to determine whether the spelling matches the arrangement, and causing the mobile body to move in a direction of an arrow of the two arrows in the different colors, based on a result of the comparing.

26. The learning toy according to claim 25, wherein the mobile body includes a light emitting element to cause a body of the mobile body to emit light, and when the mobile body reaches the command panel of the two-arrow picture, the control unit is to cause the light emitting element to emit light based on the result of the comparing.

27. The learning toy according to claim 25, wherein the mobile body includes a speaker to generate sound, and when the mobile body reaches the command panel of two-arrow picture, the control unit is to cause the speaker to generate notification sound based on the result of the comparing.

* * * * *

UNITED STATES PATENT AND TRADEMARK OFFICE
CERTIFICATE OF CORRECTION

PATENT NO. : 11,645,944 B2
APPLICATION NO. : 16/624003
DATED : May 9, 2023
INVENTOR(S) : Toshiko Tsuchiya It is certified that error appears in the above-identified patent and that said Letters Patent is hereby corrected as shown below:

In the Claims

Column 56, Line 19:
In Claim 11, after "of" delete "the".

Signed and Sealed this
Eleventh Day of July, 2023

Katherine Kelly Vidal
*Director of the United States Patent and Trademark Office*